(12) United States Patent
Weinreb et al.

(10) Patent No.: US 6,795,898 B2
(45) Date of Patent: *Sep. 21, 2004

(54) METHOD AND APPARATUS FOR VIRTUAL MEMORY MAPPING AND TRANSACTION MANAGEMENT IN AN OBJECT-ORIENTED DATABASE SYSTEM

(75) Inventors: Daniel L. Weinreb, Arlington, MA (US); Sam J. Haradvala, Weston, MA (US)

(73) Assignee: Progress Software Corporation, Bedford, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/800,257

(22) Filed: Mar. 6, 2001

(65) Prior Publication Data

US 2001/0034822 A1 Oct. 25, 2001

Related U.S. Application Data

(62) Division of application No. 08/456,025, filed on May 31, 1995, now Pat. No. 6,199,141, which is a division of application No. 07/674,874, filed on Mar. 22, 1991, now Pat. No. 5,426,747.

(51) Int. Cl.[7] .............................................. G06F 12/08
(52) U.S. Cl. ..................... 711/119; 711/144; 711/145; 711/152; 711/207; 711/208
(58) Field of Search ................. 711/119–122, 141, 711/144–145, 203, 133–134, 159, 205–209, 221; 707/1, 100, 203, 205; 709/219, 202, 203, 200, 216; 710/200

(56) References Cited

U.S. PATENT DOCUMENTS

| | | |
|---|---|---|
| 4,394,731 A | 7/1983 | Flusche et al. ............. 364/200 |
| 4,814,971 A | 3/1989 | Thatte ........................ 364/200 |
| 4,853,843 A * | 8/1989 | Ecklund ..................... 707/203 |
| 4,922,414 A | 5/1990 | Holloway et al. .......... 364/200 |
| 4,922,415 A | 5/1990 | Hemdal ...................... 364/200 |
| 4,989,132 A | 1/1991 | Mellender et al. ......... 364/200 |
| 5,113,519 A | 5/1992 | Johnson et al. ............. 395/600 |
| 5,157,777 A | 10/1992 | Lai et al. .................... 395/425 |
| 5,161,227 A | 11/1992 | Dias et al. .................. 395/650 |
| 5,202,971 A | 4/1993 | Henson et al. .............. 395/425 |
| 5,210,848 A | 5/1993 | Liu ............................. 395/425 |

(List continued on next page.)

FOREIGN PATENT DOCUMENTS

WO   WO 91/03024   3/1991   .................. 15/403

OTHER PUBLICATIONS

Richardson et al., "Persistence in the E Language: Issues and Implementation," Computer Sciences Technical Report #791 Sep. 1988, Computer Sciences Department, University of Wisconsin, Madison, WI, pp. 1–42.

(List continued on next page.)

Primary Examiner—Denise Tran
(74) Attorney, Agent, or Firm—Fenwick & West LLP

(57) ABSTRACT

An apparatus and method are provided for virtual memory mapping and transaction management in an object-oriented database system having permanent storage for storing data in at least one database, at least one cache memory for temporarily storing data, and a processing unit which runs application programs which request data using virtual addresses. When a data request is made, either for read or write, from a given client computer in a system, other client computers in the system are queried to determine if the requested data is cached and/or locked in a manner inconsistent with the requested use, and the inconsistent caching is downgraded or the transfer delayed until such downgrading can be performed.

47 Claims, 32 Drawing Sheets

U.S. PATENT DOCUMENTS

| | | | | |
|---|---|---|---|---|
| 5,222,217 A | * | 6/1993 | Blount et al. | 707/204 |
| 5,261,069 A | * | 11/1993 | Wilkinson et al. | 711/145 |
| 5,276,835 A | | 1/1994 | Mohan et al. | 395/425 |
| 5,280,614 A | | 1/1994 | Munroe et al. | 395/650 |
| 5,295,256 A | | 3/1994 | Bapat | 395/500 |
| 5,297,269 A | * | 3/1994 | Donaldson et al. | 711/145 |
| 5,301,290 A | | 4/1994 | Tetzlaff et al. | 395/425 |
| 5,327,556 A | | 7/1994 | Mohan et al. | 395/600 |
| 5,426,747 A | | 6/1995 | Weinreb et al. | 395/400 |
| 5,537,574 A | | 7/1996 | Elko et al. | 395/468 |
| 5,649,139 A | | 7/1997 | Weinreb et al. | 395/412 |
| 5,978,570 A | * | 11/1999 | Hillis | 711/200 |
| 6,199,141 B1 | * | 3/2001 | Weinreb et al. | 711/118 |

OTHER PUBLICATIONS

Rowe, "A Shared Object Hierarchy," IEEE 1986, pp. 160–170.

Shekita, "High–Performance Implementation Techniques for Next–Generation Database Systems," Ph.D. Thesis, University of Wisconsin–Madison, 1990. Also available as Computer Sciences Technical Report #1026, University of Wisconsin–Madison, May 1991, pp. 1–142.

"Memory Architectures", Chapter 16 of Computation Structures, 6.004 Course Notes, Jul. 19, 1988, MIT, pp. 497–584.

Notice of Allowability with Reasons for Allowance for Related U.S. patent application No. 08/456,237 (now U.S. Pat. No. 5,649,139).

Patent Prosecution documents for Related U.S. patent application No. 07/674,874 (now U.S. Pat. No. 5,426,747) including Notice of Allowability, Final Office Action dated Apr. 22, 1994, and Office Action dated Jun. 17, 1993.

Patent Prosecution documents for Related U.S. Patent Application No. 08/456,025 (now U.S. Pat. No. 6,199,141) including Notice of Allowability, Final Office Action dated Dec. 10, 1999, Office Action dated Mar. 17, 1999, Advisory Action dated Dec. 11, 1998, Interview Summary dated Oct. 15, 1998, Office Action dated Apr. 15, 1998, Office Action dated Aug: 7, 1997, and Office Action dated Dec. 26, 1996.

Patent Prosecution documents for Related U.S. Patent Application No. 08/430,389 (abandoned) including Office Action dated Feb. 27, 1997, Office Action dated Oct. 30, 1996, Notice of Abandonment dated Sep. 10, 1997, and Patent Application.

Agrawal et al., "ODE (Object Database and Environment): The Language and the Data Model," ACM–SIGMOD 1989 Int'l Conf. on Management of Data (May–Jun. 1989), pp. 36–45.

Atkinson et al., "An Approach to Persistent Programming," in Readings in Object–Oriented Database Systems, S.B. Zdonik and D. Maier, Eds., San Mateo, CA: Morgan Kaufman, 1990, pp. 141–146.

Cagan, "The HP SoftBeach Environment: An Architecture For a New Generation of Software Tools," Hewlett–Packard Journal, Jun. 1990, pp. 36–47.

Carey et al., "Data Caching Tradeoffs In Client–Server DBMS Architectures," In Proceedings ACM SIGMOD Int'l Conf. on the Management of Data (1991), pp. 357–366.

Cattell, "Object–Oriented DBMS Performance Measurement," Advances in Object–Oriented Database Systems, 2nd International Workshop, pp. 364–367, 1988.

Cattell et al., "Object Operations Benchmark", ACM Transactions on Database Systems, vol. 17, No. 1, Mar. 1992, pp. 1–31, 1992.

Chou et al., "Versions and Change Notification In an Object Oriental Database System", Proc. 25th ACM/IEEE Design Automation Conference, pp. 275–281, 1988.

Croker et al., "Dynamic Tree–Locking Protocol", Int'l Conf. on Data Engineering, Los Angeles, CA, Feb. 5–7, 1986, Sponsor: IEEE Computer Soc., Los Alamitos, CA, pp. 49–56, 1986.

Fromme, "HP Encapsulator: Bridging the Generation Gap," Hewlett–Packard Journal, Jun. 1990, pp. 59–68.

Garza et al., "Transaction Management In an Object–Oriented Database System", SIGMOD Record, vol. 17, No. 3, pp. 37–45, Sep. 1988.

Gerety, "A New Generation of Software Development Tools," Hewlett–Packard Journal, Jun. 1990, pp. 48–58.

Goldstein et al., "A Layered Approach to Software Design," Xerox PARC CSL–80–5, Palo Alto, CA: Xerox Palo Alto Research Center, Dec. 1980, pp. 1–31.

Goldstein et al., "An Experimental Description–Based Programming Environment: Four Reports," Xerox PARC CSL–81–3 Palo Alto, CA: Xerox Palo Alto Research Center Mar. 1981, pp. 1–43.

Hornick et al., "A Shared, Segmented Memory System for an Object–Oriented Database," ACM Transactions on Office Information Systems, vol. 5, No. 1, Jan. 1987, pp. 70–95.

Jenq et al., "Query Processing In Distributed ORION", Advances in Database Technology–EDBT '90 Int'l Conf. on Extending Database Technology, Proceedings, pp. 169–187, 1990.

Kazar et al., "Synchronization and Caching Issues in the Andrew File System," In Usenix Conference Proceedings, (Dallas, Winter 1988), pp. 27–36.

Kemper et al., "Access Support in Object Bases," in Proceedings ACM SIGMOD Int'l Conference on Management of Data, (1990), pp. 364–374.

Kemper et al., "Adaptable Pointer Swizzling Strategies In Object Bases", 1993 IEEE 9th Int'l Conf. on Data Engineering Proceedings, 1993, pp. 155–162.

Khoshafian et al., "Storage Management For Persistent Complex Objects", Information Systems, vol. 15, No. 3, 1990, pp. 303–320, 1990.

Lamb et al., "The Object Store Database System," Communications of the ACM, vol. 34, No. 10, Oct. 1991, pp. 50–63.

Maier, "Making Database Systems Fast Enough for CAD Applications," in Object–Oriented Concepts, Database and Applications, W. Kim & F. Lochovsky, Eds., Addison–Wesley, Reading, Mass, 1989 pp. 573–581.

Moss et al., "Working with persistent objects: To swizzle or not to swizzle", IEEE Transactions on Software Engineering, vol. 18, No. 8, Aug. 1992, pp. 657–673, 1992.

Nguyen et al., "Schema Change Propagation In Object–Oriented Databases", Information Processing 89. Proceedings of the IFIP 11th World Computer Congress, pp. 815–820, 1989.

Rubenstein et al., "Benchmarking Simple Database Operations" SIGMOD Record, vol. 16, No. 3, pp. 387–394, Dec. 1987.

Shekita et al., "A Performance Evaluation of Pointer–Based Joins," in Proceedings ACM SIGMOD Int'l Conference on Management of Data (1990), pp. 300–311.

Spector et al., "Uniting File Systems," Unix Review, vol. 7, No. 3, Mar. 1989, pp. 61–70.

Traiger, "Virtual Memory Management for Database Systems", ACM Operating Systems Review, vol. 16, No. 4, Oct. 1982, pp. 26–48.

Weinreb et al., "An Object–Oriented Database System to Support an Integrated Programming Environment," in Object Oriented Databases with Applications to CASE, Networks, and VLSI CAD, (Englewood Cliffs, NJ: Prentice–Hall, 1991), R. Grupta and E. Horowitz, Eds., pp. 117–129. Also in IEEE Data Engineering, 11, 2, Jun. 1988.

Clay et al., "Unix Extensions for High–Performance Transactions Processing," published in Workshop Proceedings of the Usenix Transactions Processing Workshop, May 1989, pp. 73–80.

* cited by examiner

| PAGE ; SEGMENT ; DATABASE | OWNER(S) | STATUS |
|---|---|---|
| 5 ; 4 ; a/b/c | 'T' | 'R' |
| ••••• | | |

{194} {196} {198}

{192}

OWNERSHIP TABLE, 190

Fig. 14

| OTHER | DATABASE SEGMENT | PHYSICAL |
|---|---|---|
| ○ ○ ○ 176,178, 182,184, 185 | 174 | 172 |

CACHE DIRECTORY, 180

Fig. 17A

| OTHER | VIRTUAL | PHYSICAL |
|---|---|---|
| (226, 227) ○ ○ ○ | 225 | 228 |

VIRTUAL MEMORY MAP, 224

Fig. 17B

| OTHER | DATABASE SEGMENT | VIRTUAL |
|---|---|---|
| ○ ○ ○ 222 | 214,216,218 | 222 |

VIRTUAL ADDRESS MAP, 210

Fig. 17C

METHOD AND APPARATUS FOR VIRTUAL MEMORY MAPPING AND TRANSACTION MANAGEMENT IN AN OBJECT-ORIENTED DATABASE SYSTEM

The present application is a divisional of U.S. patent application Ser. No. 08/456,025, filed on May 31, 1995, now issued as U.S. Pat. No. 6,199,141, which is a divisional of U.S. patent application Ser. No. 07/674,874, filed on Mar. 22, 1991, now issued as U.S. Pat. No. 5,426,747. Both of these applications are hereby incorporated herein by reference.

FIELD OF THE INVENTION

This invention relates to an object-oriented database system, and more particularly to a method and apparatus for virtual memory mapping and transaction management in a computer system having at least one object-oriented database.

BACKGROUND OF THE INVENTION

Over the past few years, a new category of data management products has emerged. They are variously called "object-oriented database systems", "extended database systems", or "database programming languages". They are intended to be used by applications that are generally complex, data-intensive programs, which operate on structurally complex databases containing large numbers of interconnected objects.

Inter-object references, sometimes called pointers, provide this complex structure. These programs consume time by accessing and updating objects, and following the intricate connections between objects, using both associative queries and direct traversal, performing some amount of computation as each object is visited. Typical application areas are computer-aided design, manufacturing, and engineering, software development, electronic publishing, multimedia office automation, and geographical information systems. Because of this application environment it is important for an object-oriented database system to be fast.

Often, a number of work stations or other client computers are connected to access the database in a distributed manner, normally through a server computer associated with the database. Each client computer has its own cache memory in which data required by an application program being run on the client computer are placed.

Every object-oriented database system has some way to identify an object. Current systems use a thing called an "object identifier" (OID), which embodies a reference to an object. In a sense, an OID is the name of an object. An operation called "dereferencing", finds an object from a given name of an object.

In most systems, object identifiers are data structures defined by software, thus dereferencing involves a software procedure, such as a conditional test to determine whether the object is already in memory, which often involves a table lookup. This software procedure generally takes at least a few instructions, and thus requires a fair amount of time. Moreover, a dereferencing step is completed for each access to the object. These operations significantly slow down processing in an application, specifically when many inter-object references are made.

Moreover, names that are commonly used for object identifiers are not in the same format that the computer hardware uses as its own virtual memory addresses. Thus, inter-object references take longer to dereference than ordinary program data. Furthermore, a software conditional check takes extra time.

Also, in current systems, data cannot remain in the client computer between transactions. Data can be cached on the client computer, but when a transaction ends, the client cache has to be discarded. Although this requirement insures consistency of data, it increases communication between the client and the server computers and fails to make use of the principles of locality which encourage the use of a cache in the first place.

A need, therefore, exists for an improved method and apparatus for facilitating dereferencing the name of an object to its corresponding object.

Another object of the invention is to name objects using the format of the computer hardware. More particularly, it is an object to provide virtual addresses as pointers to objects in the database.

Another object of the invention is to provide a hardware conditional check for determining if an object is in virtual memory in order to replace software conditional checks.

Still another object of the present invention is to minimize communication between a server computer and a client computer. More particularly, it is an object to provide a mechanism to allow a client computer to keep data in its cache between transactions and to ensure data consistency and coherency.

SUMMARY OF THE INVENTION

In accordance with the above and other objects, features and advantages of the invention, there is provided an apparatus and a method for virtual memory mapping and transaction management for an object-oriented data base system having at least one permanent storage means for storing data and at least one data base, at least cache memory for temporarily storing data addressed by physical addresses, and a processing unit including means for requesting data utilizing virtual addresses to access data in the cache memory, means for mapping virtual addresses to physical addresses and means for detecting when data requested by the requesting means is not available at the virtual address utilized. Typically, the system has a plurality of client computers each having a cache memory, interconnected by a network, and each permanent storage means has a server computer. A single computer may serve as both a client computer and a server computer.

The apparatus operates by detecting when data requested by a client computer is not available at the utilized virtual address. An application program running on a client computer may issue a command when it knows data is required, but detection preferably arises from a fault normally occurring in response to an unsuccessful data access attempt.

When the client computer detects that requested data is not available, it determines if the requested data is in the cache memory, transfers the requested data from the permanent storage means to the cache memory if the requested data is not in the cache memory, and instructs the means for mapping to map the virtual address of the requested data to the physical address of the data in the cache memory. If the requested data includes pointers containing persistent addresses, the apparatus relocates inbound the pointers in the requested data from the persistent addresses to virtual addresses.

Sometimes a virtual address that is used by an application program is not assigned to any data, and the apparatus signals an error to the means for requesting the data using that virtual address indicating that the virtual address is not valid. Otherwise the virtual address is valid, and it is determined whether the portion of the database containing the requested data has also been assigned virtual addresses. If it has not been assigned virtual addresses, such addresses are assigned to it. database portion located at a client computer is cached thereat for either read or write. When a database portion is utilized in response to a read request, it is locked for read and when used in response to a write request, it is locked for write. When the transaction commits, all locked data portions are unlocked, but can remain cached.

When a server computer receives a request for data in response to a read request, the server computer determines if any other client computer has the requested material, for example, a page or segment, encached for write. If no other client computer has the page encached for write, the page or other data section may be transferred to the requesting client computer's cache memory. Each server preferably has an ownership table with an entry for each page of the server's permanent storage which is encached by a client computer and indicating whether the page is encached for read or write.

The ownership table may be utilized to determine if the page is encached for write. If it is determined that a client computer has the page encached for write, the client computer is queried to determine if the page is locked for write. If the page is not locked for write, the ownership table entry for the page is downgraded from encached for write to encached for read and the transfer of the page to the requesting client computer is permitted. If the queried client computer indicates that the page is locked for write, further action is deferred until the transaction being run on the queried client computer commits. When the transaction commits, the queried client computer is downgraded to encached for read and a transfer to the queried client computer is permitted.

Each client computer preferably has a cache directory having an entry for each page in the corresponding cache memory, which entry indicates the cache state and lock state of the page. When a lock-for-write query is received at the client computer, the client computer checks its cache directory to determine if the page is locked for write. If it is determined that the page is not locked for write, the entry for the page in the cache directory is downgraded from encached for write to encached for read and a not locked response is sent to the server. If it is determined that the page is locked-for-write, the entry in the cache directory is marked "downgrade when done", the downgrading and replying to the server occurring when the transaction being run on the queried client computer commits.

When a write request is received by a server computer, the server determines if any other client computer has the page encached either for read or write and transfers the page if no other computer has the page encached. If the ownership table indicates that a client computer has the page encached, the client computers are queried to determine if the page is also locked. If a determination is made that the pages are not locked, then all entries are removed for the page from the ownership table and the requested transfer is permitted. If it is determined that the page is locked at a queried client computer, further action is deferred until transactions being run on queried client computers commit. When all transactions involving the page commit, the requested transfer is permitted. When a client computer receives a query in response to a write request, if it is determined that the page is not locked, the page is removed from the client computer cache memory and the entry for the page is removed from the cache directory. If it is determined that the page is locked, an "evict when done" entry is made in the cache directory for the page, the page being removed when the transaction commits.

Each segment in the database preferably contains at least one page and is divided into a data segment and an information segment. Different types of objects may be stored in a data segment with the information segment for each data segment containing a tag table having a tag entry for each object in the segment identifying the object type. A segment may also contain free space. Where objects are created during a transaction, the type for the new object is used to determine the size of the new object and the tag table is searched to find free space in a segment for the new object. A new object tag is then inserted in place of a free space tag, if suitable free space is found. A new tag is added at the end of the tag table if suitable free space is not found. Objects may also be deleted during a transaction, with the space in which such objects were stored being converted to free space when this occurs.

Each object type in a database may contain one or more pointers at selected offset locations in the object which point to persistent addresses in the database. Each database has a "schema" associated therewith, the schema containing an entry for each object type present in the database. Each schema entry contains a field indicating the size of the object type and an instruction indicating the offset location in the object for each pointer for the object type. The schema is transferred to a client computer before mapping at the client computer is performed, and when data is transferred to a client computer, both the data segment and corresponding information segment are transferred.

For a preferred embodiment, relocating inbound and relocating outbound are performed utilizing the tag table to determine the object type for the selected object, and then using the object type from the tag table to obtain a description of the object from the schema. Each schema instruction for the object type is then utilized to retrieve the corresponding pointer. For relocating inbound, the persistent address of each pointer is converted to a corresponding virtual address; and for relocating outbound the virtual address of each pointer is converted to the corresponding persistent address.

Each information segment may contain a persistent relocation map (PRM) of a database, which PRM indicates the beginning persistent address for a selected page or other database portion. The PRM is transferred as part of the information segment to the client computer and is utilized to determine the persistent address corresponding to a given database, segment and offset. A virtual address map (VAM) is provided at each client computer, which map indicates the beginning virtual address for a selected database portion having a given offset. The VAM is utilized to determined the virtual address corresponding to a given database, segment and offset. When relocation inbound occurs, the PRM is utilized to determine the database, segment and offset for a given persistent page address and the VAM is then used to determine the corresponding virtual page address from the determined database segment and offset. The reverse process occurs on outbound relocation. During assignment, each PRM entry is examined in turn to determine if there is a corresponding VAM entry and a new VAM is created, and thus virtual address space is allocated for each selected database portion for which it is determined that a VAM entry does not exist.

Numerous other objects, features and advantages of the invention should be apparent when considered in connection with the following detailed description taken in conjunction with the accompanying drawings in which:

BRIEF DESCRIPTION OF THE DRAWINGS

FIG. 14 is a diagram of the data structure of a server computer for monitoring ownership status of database pages.

FIGS. 17A–17C are diagrams illustrating the relationship between the cache directory, the virtual memory map and the virtual address map.

DETAILED DESCRIPTION OF THE DRAWINGS

FIGS. 1–4 illustrate a representative basic computer system in which the virtual memory mapping method and apparatus of the present invention may be utilized.

Figure 1:
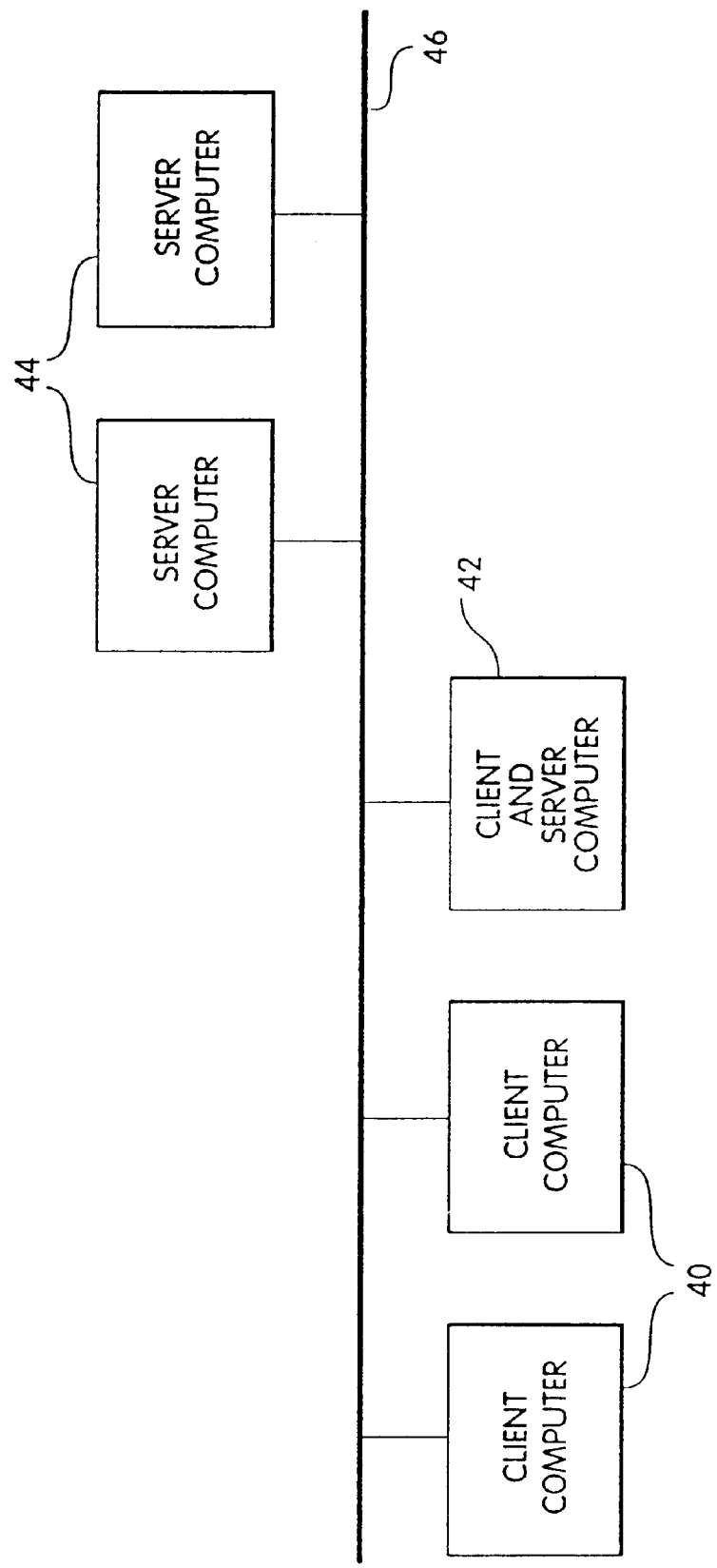
FIG. 1 is a block diagram of a typical distributed database system configuration in which the present invention may be utilized.

FIG. 1 illustrates a system in which a plurality of client computers 40, a client and server computer 42 and one or more server computers 44, are connected together by a computer network (bus) 46 or other communication path. A client computer 40 is used directly by a user and runs various application software. A server computer 44 acts as a permanent repository of data held in a database. In general, any client computer 40 can access data stored on any server computer 44. Some computers 42 act as both a client computer and a server computer. Such a computer 42 can access data stored on itself, as well as on other server computers 44. Other client computers 40 can also access data on a client and server computer 42. The database method and apparatus of the present invention can be used on a system that has at least one client and server computer 42 or at least one each of a client computer 40 and server computer 44 connected by a computer network or communication path 46. For simplicity, a client computer 40 or a computer 42 when acting as a client computer will be referred to as a "client" and a server computer 44 or a computer 42 acting as a server will be referred to as a "server".

Figure 2:
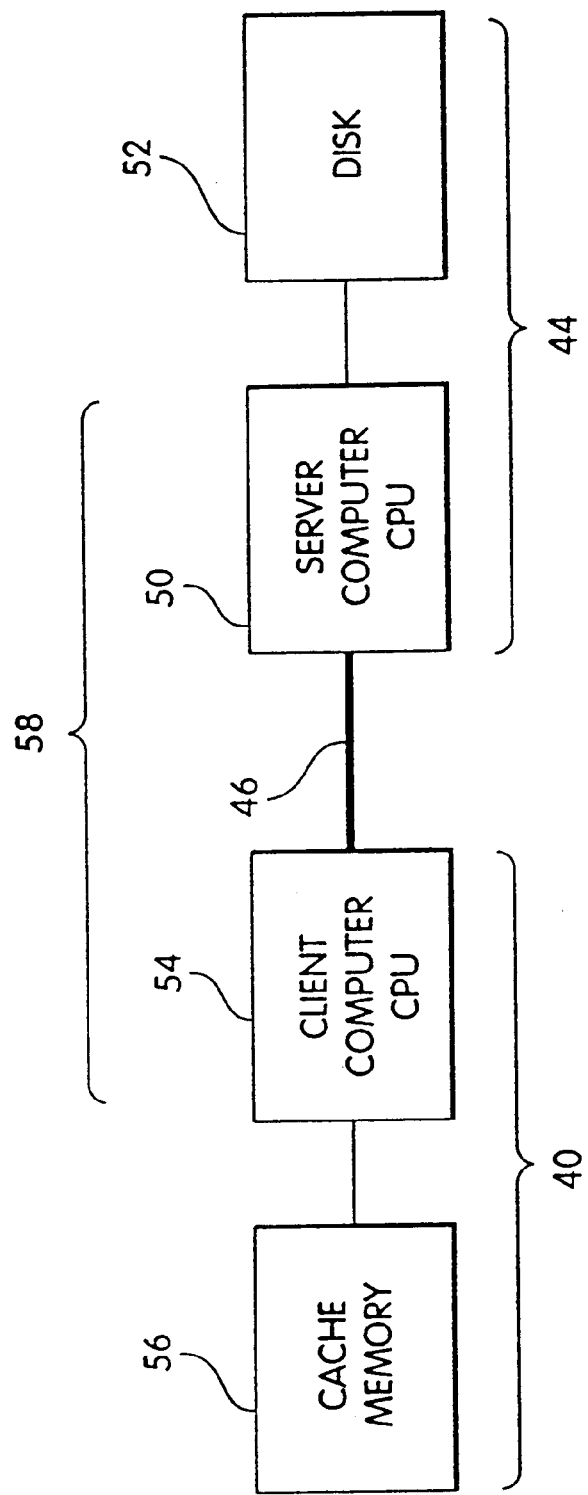
FIG. 2 is a more detailed block diagram of a portion of the system shown in FIG. 1 with separate data repositories at server computers and client computers.

FIG. 2 is a more detailed diagram of a simplified minimum system which may be used in practicing the present invention. Similar reference numbers depict similar structures throughout the drawings. A server computer 44 comprises a central processing unit (CPU) 50 connected to a disk or other mass storage medium 52 which is a permanent repository of data for one or more databases. CPU 50 moves data between disk 52 and network 46. Client computer 40 has a central processing unit (CPU) 54 which moves data between network 46 and its cache memory 56. CPU 54 also controls the virtual address space which is mapped to the physical addresses of the cache 56. An application running on a client computer 40 will manipulate data in its database by reading, writing, creating and deleting data in the cache memory 56. A client 40 performs all such manipulations on data in its cache memory 56 rather than by performing transactions across computer network 46 on data stored on a server computer 44 as is done in standard distributed database systems. When a transaction is completed at a client computer 40 on data in its cache memory 56, the results of those transactions are transferred across the network 46 to the permanent repository, or disk, 52 on the server computer 44. The method of interaction between a client computer 40 and server computer 44 is the same regardless of the number of server computers 44 and client computers 40 on a communication network.

Figure 3:
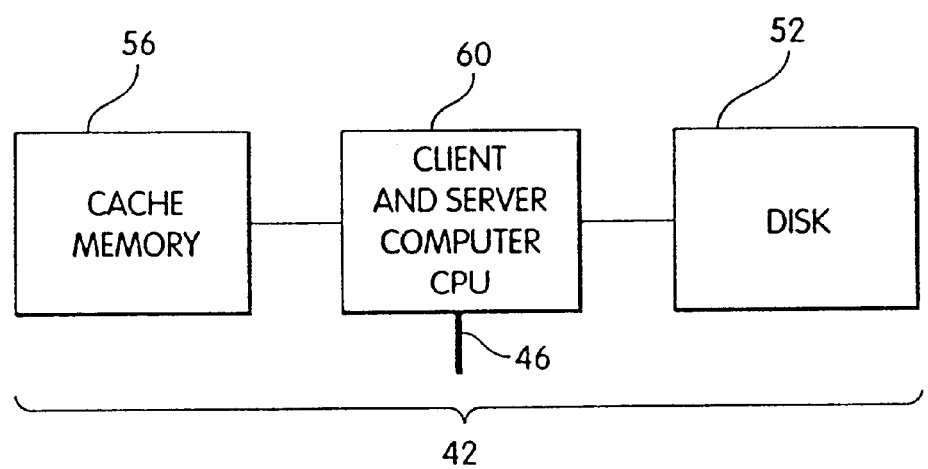
FIG. 3 is a more detailed block diagram of a system portion with a permanent repository of data and client on one computer.

FIG. 3 depicts the special case of a client and server computer 42. Such a computer can be used in the place of either a client computer 40 or server computer 44 as depicted in FIG. 2. Such a computer also may act as both a typical server computer 44 and as a typical client computer 40 in the mode of operations described in conjunction with FIG. 2.

However, a client and server computer 42 may also handle interactions between its cache memory 56 and its permanent data repository 52 via central processing unit (CPU) 60. This interaction is similar to the interaction of the combination 58 (FIG. 2) of a server computer CPU 50, client computer CPU 54 and a communication network 46. The cache memory 56 in a client and server computer 42 provides the same function as cache memory 56 of a typical client computer 40.

Figure 4:
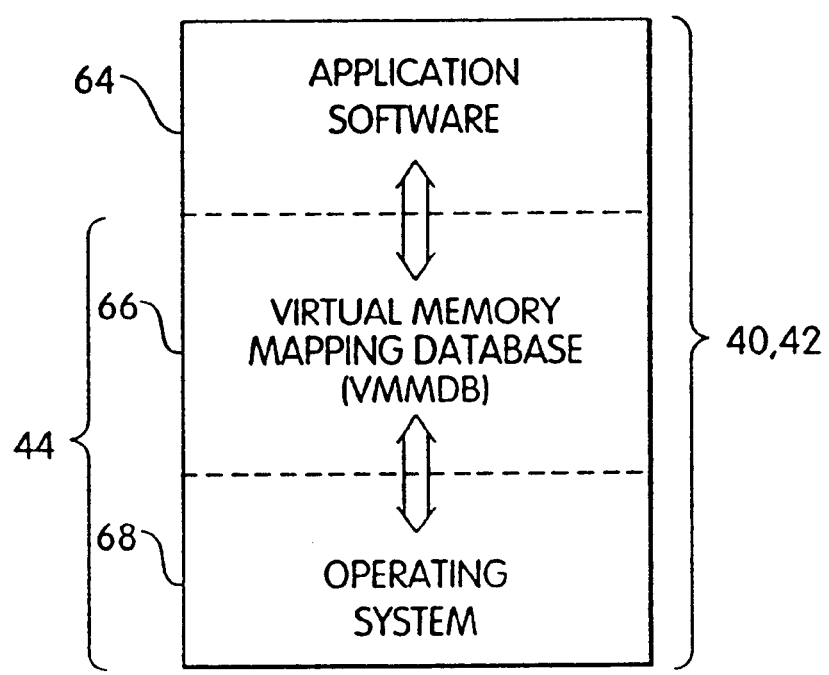
FIG. 4 illustrates how the system of the present invention interacts with other processes of a computer.

FIG. 4 illustrates the modularity and interactions of the virtual memory mapping database (VMMDB) method and apparatus of this invention with the operating system and application programs. The VMMDB 66 for a client computer 40 or a client and server computer 42 draws upon the services provided by its operating system 68. In turn, the VMMDB 66 supplies services that are used by an application program 64. At a server computer 44, the VMMDB 66 interacts with the operating system 68 to handle read and write requests from client computers and to monitor the ownership of database pages.

Figure 5:
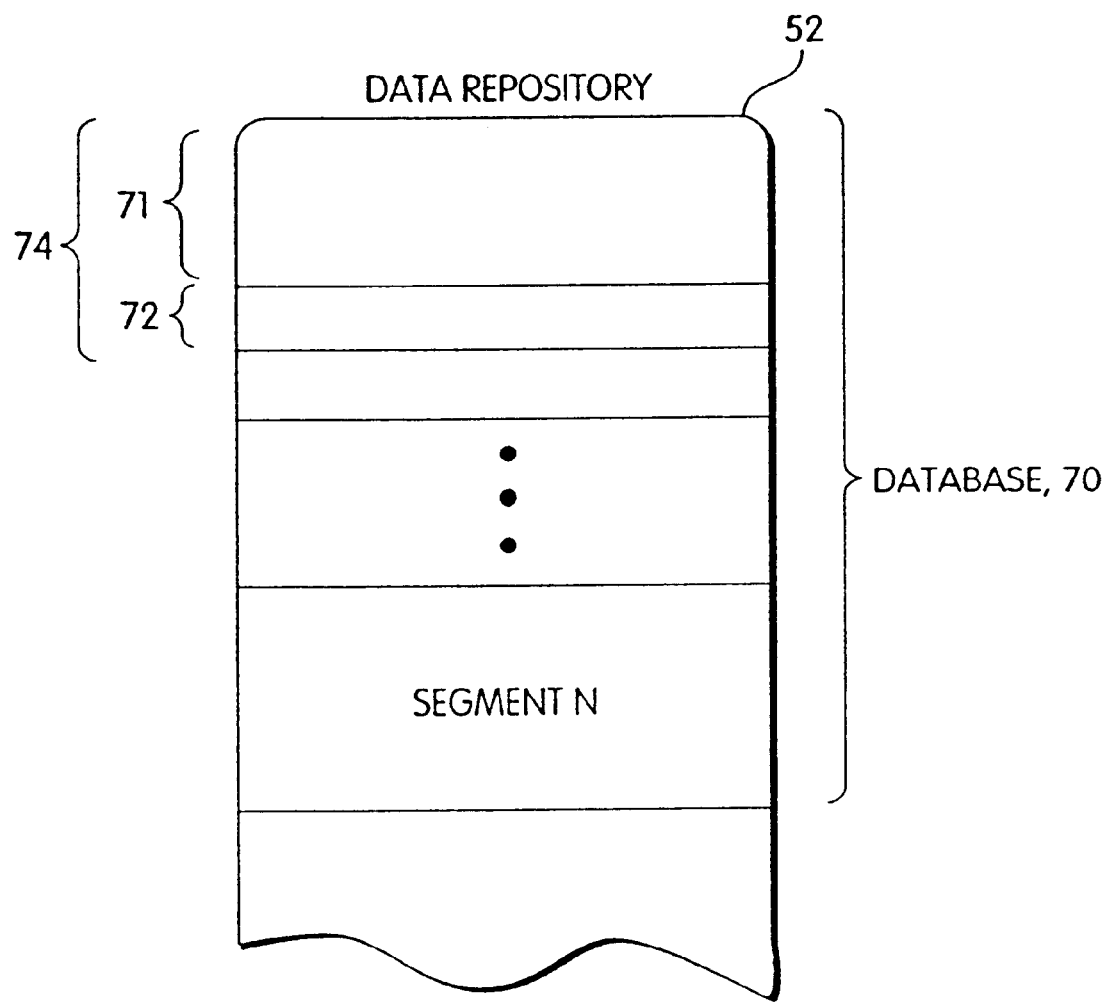
FIG. 5 is a diagram of a permanent repository of data, illustrating its division into databases and segments.

FIG. 5 illustrates the division of the permanent repository of data 52 into at least one database 70. Each database 70 is subsequently divided into at least one segment 74. Each segment contains a number of addressable locations 72 which can be addressed by an offset 71 from the beginning of segment 74. An addressable location in a database is also assigned a persistent address. This assignment of the persistent address space is performed separately for each segment 74 of a database 70. A location 72 can contain a value or a pointer corresponding to a persistent address. A pointer can point to other segments in the database. Assignment of the persistent address space of a segment is performed only for that segment and segments to which it contains pointers.

Figure 6:
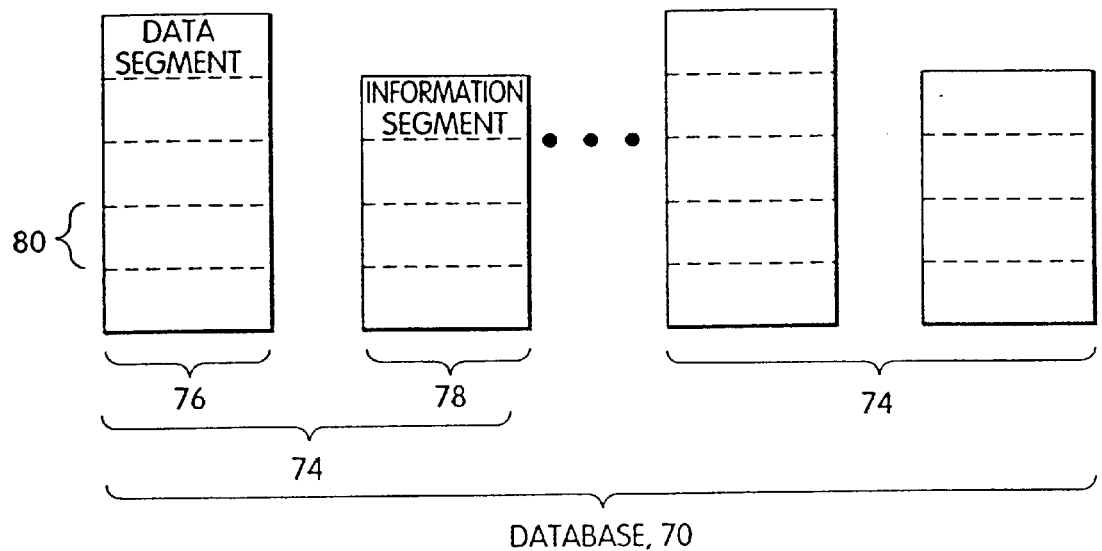
FIG. 6 is a memory diagram illustrating the possible divisions of a database for use in the present invention.

FIG. 6 illustrates in more detail the divisions of a database 70. Each segment 74 of a database 70 is divided into a data segment 76 and an information segment 78. The data segment 76 contains objects, each having a corresponding type, and free space. The information segment 78 contains data that describes the contents of the data segment 76, and includes memory allocation information and a list of tags to identify the type of each object in the data segment. Objects are only found in data segments so application programs will only access the data segments. The information segments hold internal data structures used only by the VMMDB. Each data segment 76 and information segment 78 is divided into at least one page 80. The size of a page 80 is predetermined by the computer hardware and is typically 4096 or 8192 bytes.

Although data segments and information segments appear to be adjacent in the illustration of FIG. 6, in actuality, these segments (and even parts of each segment) can appear anywhere on a disk. A standard disk file system can monitor the location of data segments and their corresponding information segments.

Figure 7:
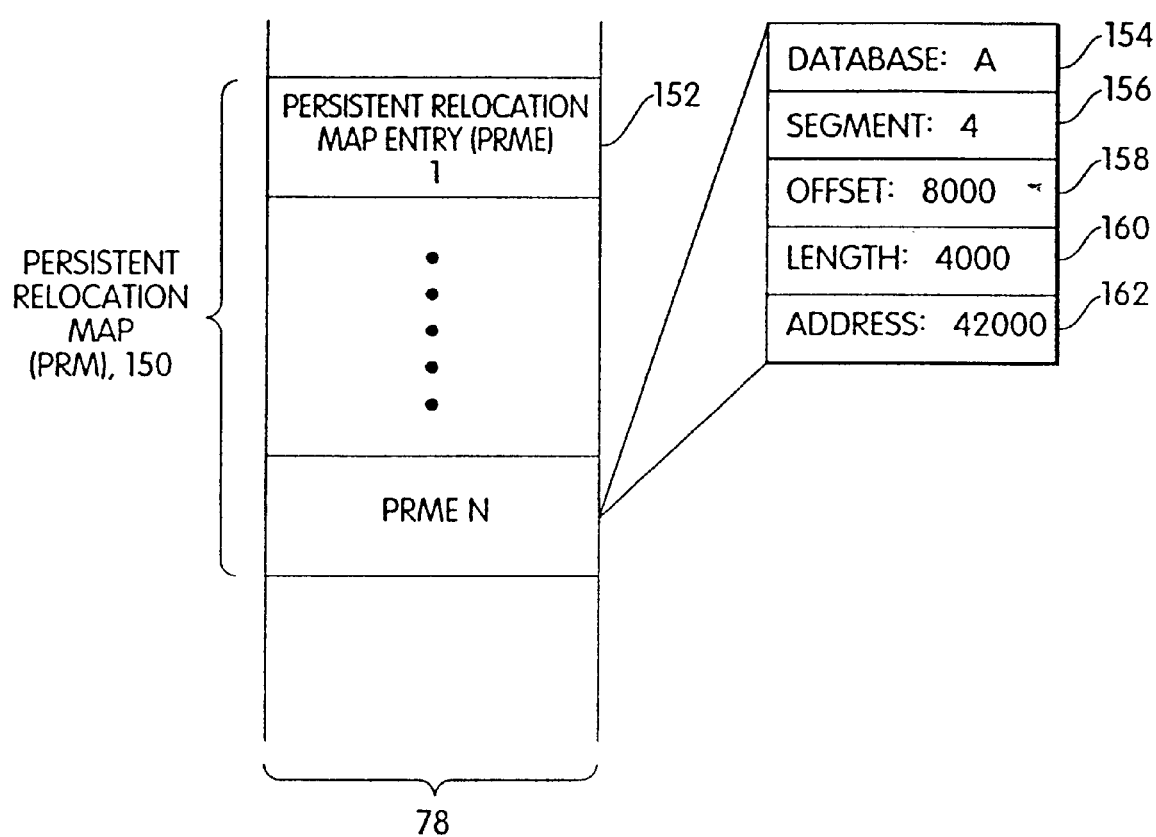
FIG. 7 is a diagram of the data structure for the map of database segments to permanent addresses.

Each information segment 78 contains a persistent relocation map 150 as illustrated in FIG. 7. The persistent relocation map 150 contains entries (PRME) 152 indicating the assignment of persistent addresses to database pages. Each PRME 152 is an entry for at least one page of a data segment. A segment thus has at least one entry in the PRM, but will have more than one entry if its pages are not contiguous, or if it contains pointers to other segments. However, the number of entries is minimized if possible.

A typical entry 152 for a set of pages contains five fields. Database field 154 contains a coded value indicating the database in which the set of pages resides. Segment field 156 indicates the segment of the database 154 in which the set of pages is located. Offset field 158 indicates the distance from the beginning of the segment 156 at which this set of pages begins. Length field 160 indicates the length or size of this page set and can be an integer for the number of pages or preferably the total length in bytes of all pages for this entry. As an example, the entry shown in FIG. 7. of database A, segment 4, offset 8,000 and length 4,000 indicates that this entry corresponds to a page of database A, located in segment 4, beginning at a location 8,000 addressable units from the beginning of segment 4 and having a length of 4,000 units. Finally, address field 162 indicates the persistent address for the first addressable location of this page (e.g. 42,000). The address field 162 and length field 160 indicate that persistent addresses 42,000 to 46,000 are allocated to this set of pages of database A, segment 4 and beginning at offset 8,000.

Figure 8:
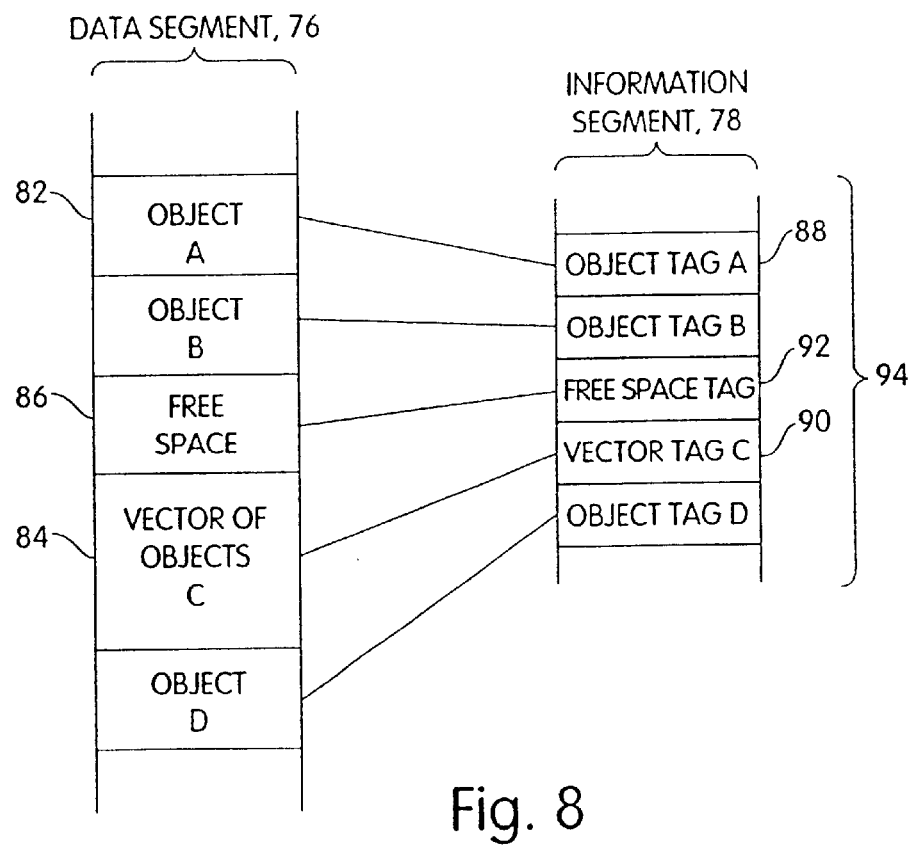
FIG. 8 is a more detailed memory diagram showing the data structure for data segments and data descriptions stored in the database.

FIG. 8 further illustrates the relationship of a data segment 76 and its corresponding information segment 78. In a data segment 76 there are typically three types of stored objects: a single object 82, a vector of objects 84 and free space 86. An object can contain one or more values which can include pointers. Free space 86 can be understood as a vector of empty objects. More than three types of objects can be used, the three shown being representative and sufficient to implement the present invention. For each object in a data segment 76, a tag is placed in the corresponding information segment 78. The group of tags is called a tag table 94. A single object 82 has a corresponding object tag 88. A vector of objects 84 will have a corresponding vector tag 90. Finally, a free space object 86 will have a corresponding free space tag 92.

Figure 9A:
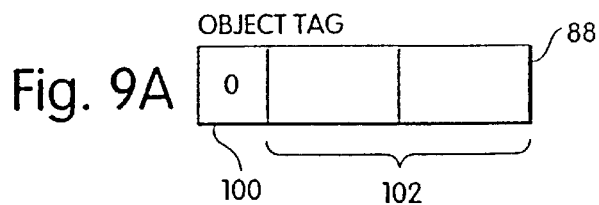
FIGS. 9A–9C are diagrams showing the data structures for three different object tags.
Figure 9B:
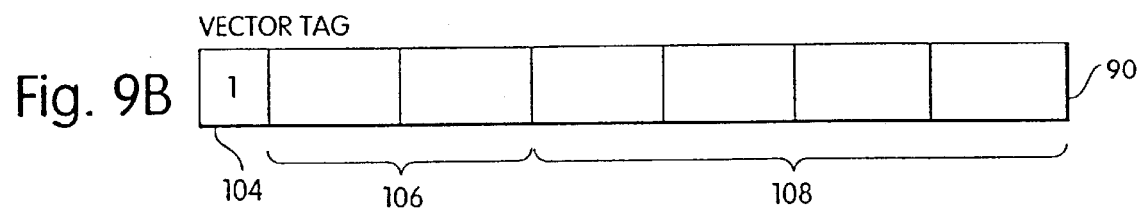
Figure 9C:
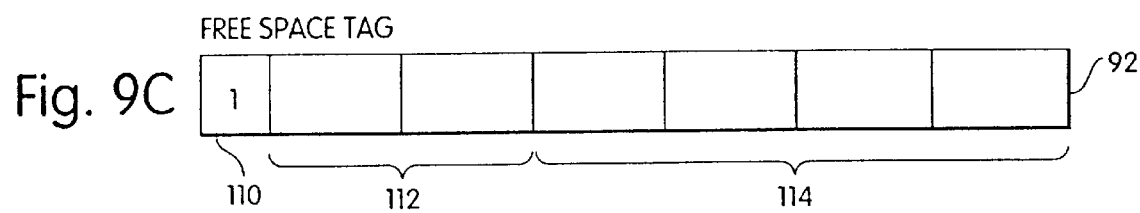

FIGS. 9A–9C illustrate in greater detail the contents of each of the tags described in FIG. 8. An object tag 86 (FIG. 9A) has an identifier field 100, and a type code field 102. A type code describes special characteristics of an object, making it possible to have a variety of types of a single object, each type having its own characteristics. Type codes will be described in more detail in connection with the description of FIGS. 10 and 11. The vector tag 90 (FIG. 9B) has an identifier field 104 and, a type code field 106 similar to type code field 102, and a length field 108 for describing the length of the vector. Finally, free space tag 92 (FIG. 9C) has a similar identifying field 110, a type code field 112, and a length field 114 to indicate the length of the free space. A free space tag is simply a special case of a vector of objects.

In the preferred embodiment of this invention, single object tags 88 have a most significant bit 100 set to "0" and the remaining bytes contain a number called the "type code". These tags are two bytes long. Vector tags 90 have a most significant bit set to '1', a type code and a count field indicating the length of the vector. These tags are 6 bytes long. Free space tags 92 are a special type of vector tag also having a most significant bit set to "1", but having a special type code 112. They also contain a count field indicating the size of the free space and are 6 bytes long. The number of object types and tags used in an implementation of the present invention is dependent upon the kinds of databases used and types of manipulations performed and thus is not limited to the example described above.

The tag table 94 (FIG. 8) is used to find locations within a data segment containing persistent addresses that need to be relocated. This table is based on the principle that the contents of every data segment comprise an end-to-end sequence of objects, each of which is one of a known number of types, (in this example three): (1) a simple object, (2) a vector (one dimensional array) of objects or (3) free space. Thus, a tag table is a data structure comprising a sequence of "tags" which directly corresponds to the sequence of objects in the data segment.

Figure 10:
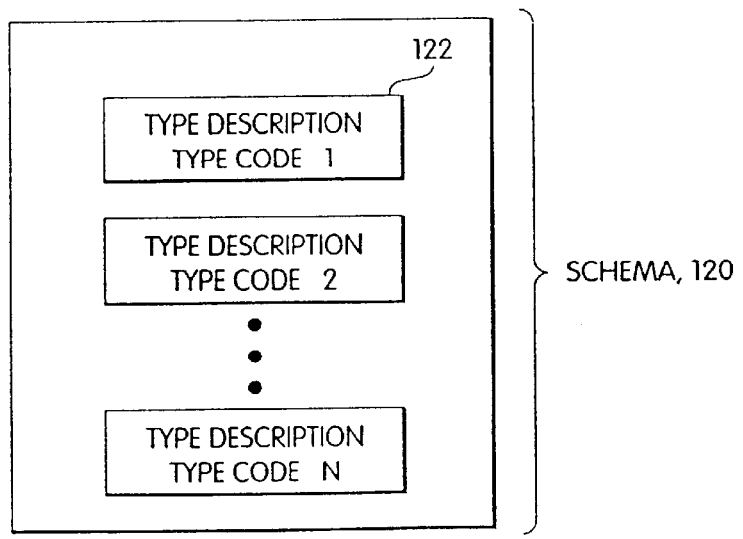
FIG. 10 is a diagram showing the data structure for a schema.

A data structure called a "schema", which is part of a database, contains a set of type descriptions, one for each particular object type in the database. The schema is indexed by type codes 102 and 106 (FIGS. 9A–9C) A type description indicates the size of an object and locations of pointer values in that object. The schema, which is normally allocated its own segment in the database, is illustrated in FIG. 10. Schema 120 contains a type description 122 for each different object type (as indicated by a type code) contained in the corresponding database. Each type description 122 describes one object type for which a unique type code value has been assigned. Given a type code value 102, 106 from an object tag, the VMMDB can use the type code to search schema 120 for the type description 122 corresponding to that object type.

Figure 11:
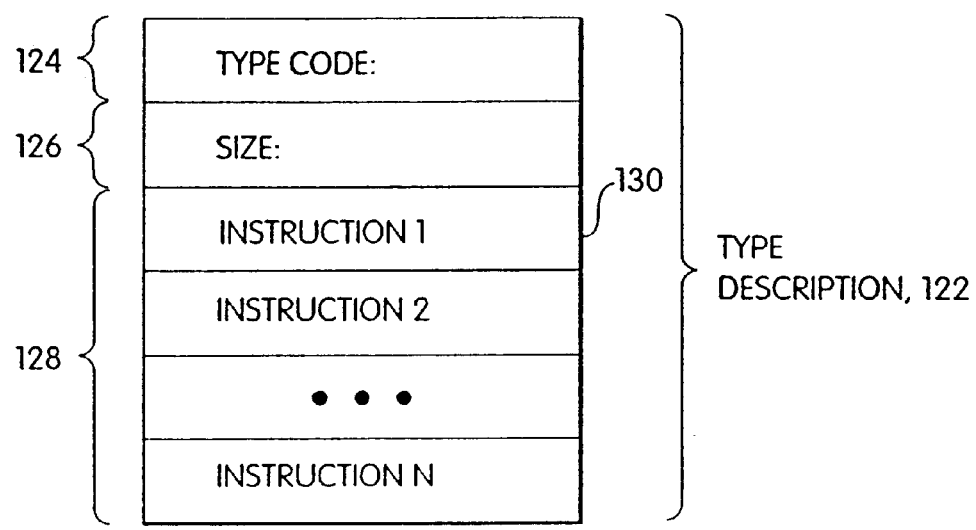
FIG. 11 is a diagram showing the data structure of a schema entry.

The contents of a type description 122 are illustrated in FIG. 11. The type description 122, indexed by its type code field 124, includes a size field 126 containing the size of an object of that type, and a set 128 of fields for indicating which locations within an object of that type contain pointers. These fields 128 are a set of instructions 130 or directives to be interpreted by the VMMDB to find locations of pointers within an object. They are normally not machine instructions that the hardware CPU understands.

Figure 12:
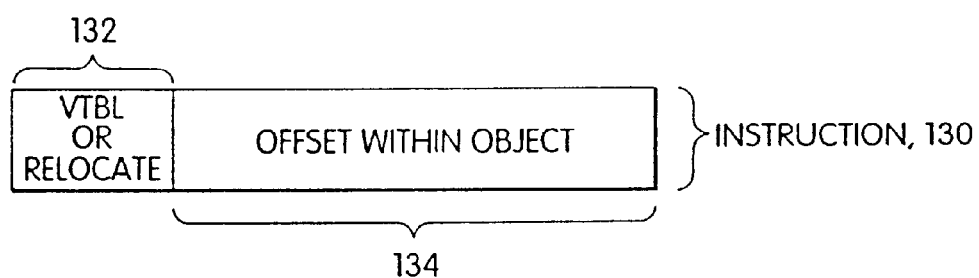
FIG. 12 is a diagram of the data structure for instructions for a type description dictionary entry.

There are two kinds of these instructions: one indicates that a pointer is at a particular offset within an object type, and the other indicates that a VTBL pointer is found at a particular offset within an object type. (A VTBL pointer is part of the implementation of the C++ language, and is simply a special type of pointer for which the VMMDB performs relocation.) FIG. 12 illustrates the format of an instruction 130 (FIG. 11) from a type description 122. Each instruction has a field 132 which indicates whether this pointer is a VTBL pointer or a pointer to be relocated. Field 134 indicates the offset from the beginning of the object at which the pointer resides.

Thus, an information segment 78 keeps track of all pointers that are located within its corresponding data segment 76 via the tag table 94 and schema 120 (which contains type descriptions 122). It also keeps track of the segment-specific assignment of the persistent address space with the persistent relocation map.

Figure 13:
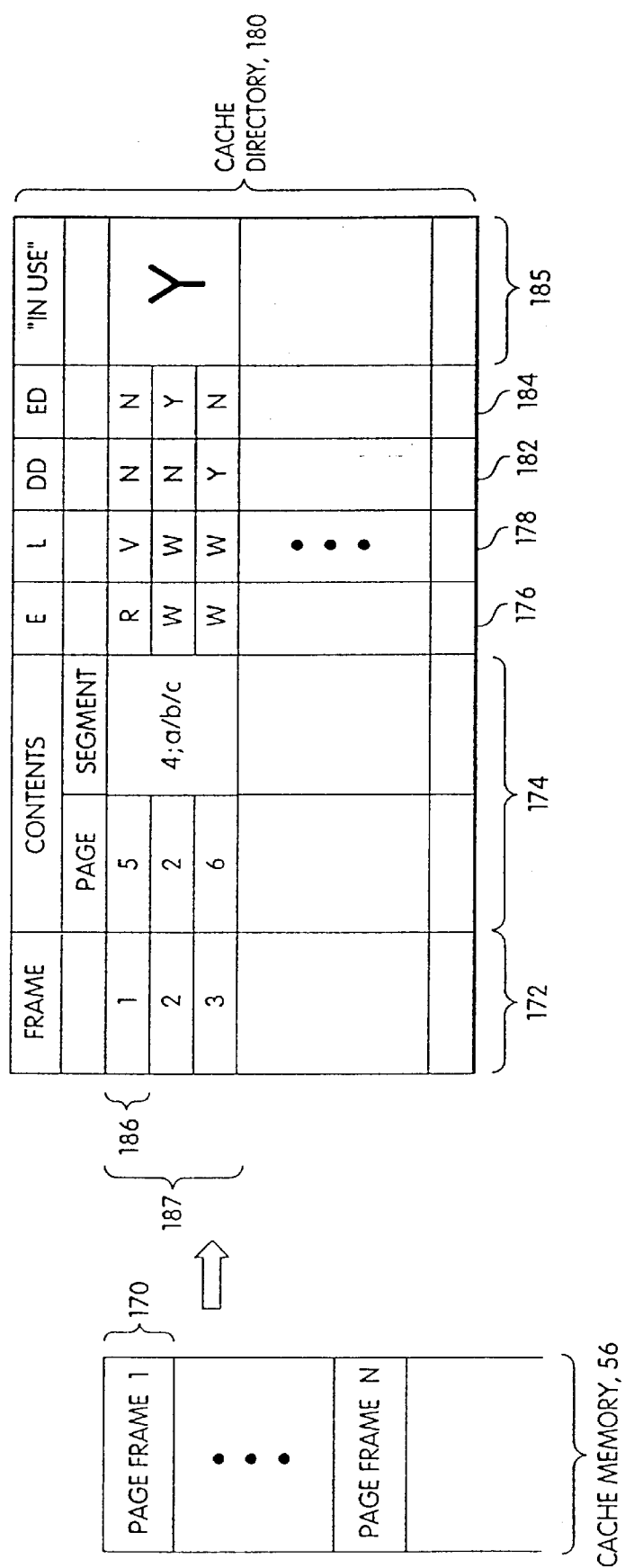
FIG. 13 is a diagram of the data structure for a client computer for monitoring the client cache.

FIG. 13 illustrates the structure of the cache memory 56 of a client computer 40 and a structure called the cache directory used by the client computer CPU 54 to monitor cache memory status. A client cache memory 56 comprises a set of page frames 170 which correspond to a subset of the physical address space. Each page frame 170 either is free or holds a page of a database. The client computer maintains the cache directory 180 which monitors which page frames 170 contain database pages and which page frames are free. No two page frames hold the same page. Given a page of a database, e.g. page "5", segment "4", database "/A/B/C," the VMMDB can use the cache directory 180 to determine efficiently the page frame 170 that holds the page (the physical location of the page), or that the page is not in the cache. To this end, the cache directory 180 contains a frame field 172, for the name of a page, and a contents field 174 which indicates the page frame holding the page. If a page is not in the cache, there is no entry for it.

Each page frame 170 in the cache directory 180 has four state values associated with it. The first two indicate the encached state 176 and the locked state 178. The encached state can either be "encached for read" (ER) or "encached for write" (EW). The locked state can either be "unlocked" (U), "locked for read" (LR), or "locked for write" (LW). To say that the state of a page is EWLR, means it is encached for write and locked for read. To say that the state of the page is ER, means it is encached for read and unlocked. The other two flags of a cache directory entry are called "downgrade when done" 182, and "evict when done" 184. A per segment "segment in use" field 185 is also provided. The purpose of these fields are described later in connection with the flowcharts of operation.

Figure 14:
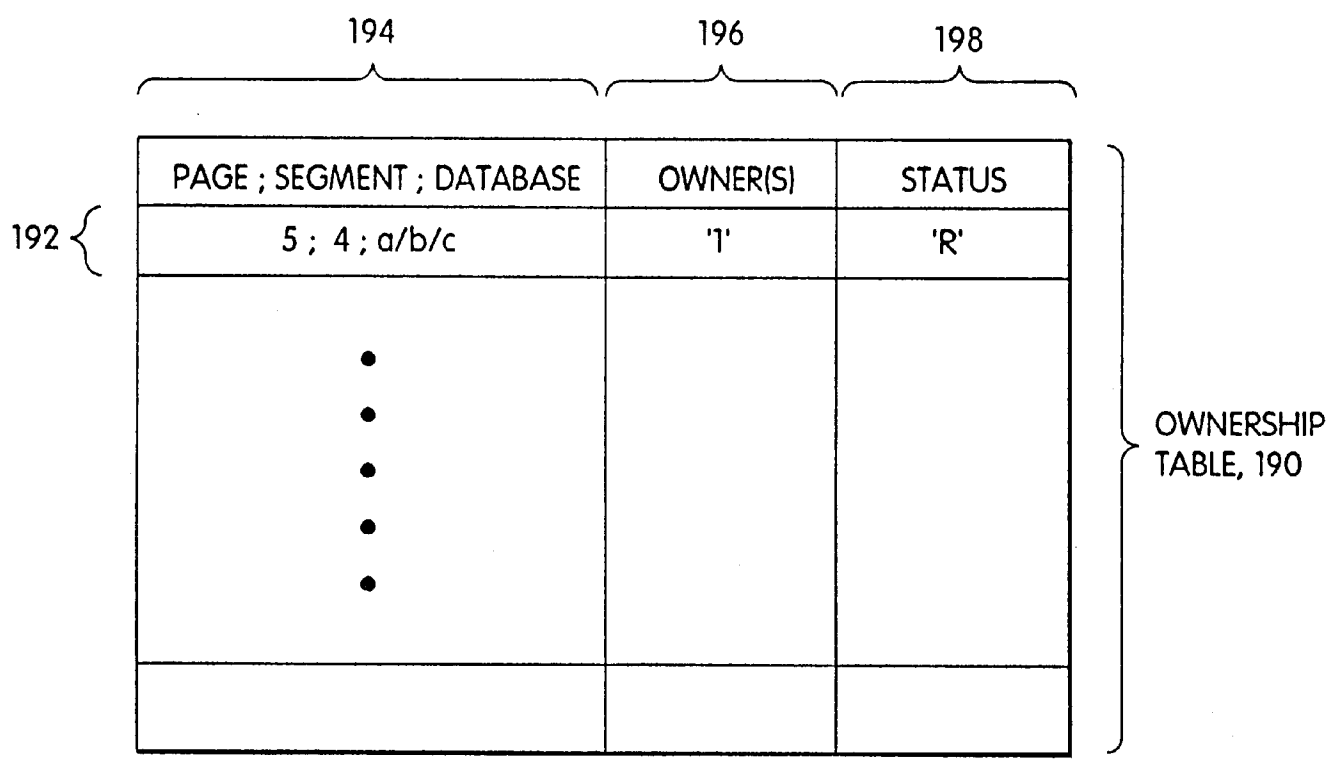

A server 44 keeps track of which client 40 (or clients) has a copy of a page from a database and whether the page is encached for read or for write at that client (or clients). The server monitors database use with an ownership table, illustrated in FIG. 14. The ownership table 190 contains entries 192 comprising three fields. A contents field 194 indicates a page of a database, with a page number, segment number and database name. The owner field 196 indicates which client or clients are currently using that page. The owner field is preferably an array of client names. Finally, the status field 198 indicates whether the page is encached at a client for reading or for writing. Only one value needs to be stored because either all clients will have a page encached for read or only one client will have the page encached for write.

The combination of the cache directory 180 and the ownership table 190 help to maintain cache coherency. The cache coherency rules used in the present invention, the description of which follows, provide an improvement over the well known two-phase locking mechanism. A client process can only modify the contents of a page if the page frame holding the page is locked for write by the client. A page frame can only be locked for write if it is encached for write. Verification of this status and locking are performed using the cache directory at the client. If any client has a page frame encached for write, no other client computer can have the same page in its cache. It is possible for many clients to have a copy of a page encached for read, but only one client at a time can have a copy of a page encached for write. Verification of the encached status is performed by the server using its ownership table. If no transaction is in progress in the client computer, all page frames in its cache are unlocked. If a transaction is in progress at a client, a locked page cannot become unlocked, and a page that is locked for write cannot become locked for read. That is, a page can be locked or upgraded from read to write by a client during a transaction, but cannot be unlocked nor downgraded during a transaction. Locks are released when a transaction commits.

This form of two-phase locking is an improvement because locks are monitored at a client computer rather than a server computer. Furthermore, data is cached and used at the client rather than at the server. Thus, data can be used for more than one transaction without extra calls to the server. A further advantage of this arrangement and method is that there is no overhead of sending locking information to the server computer. Standard features of two-phase locking can still be used, however, including prevention of write locks until all data is available and provision for "time-outs" to prevent deadlock.

Figure 15:
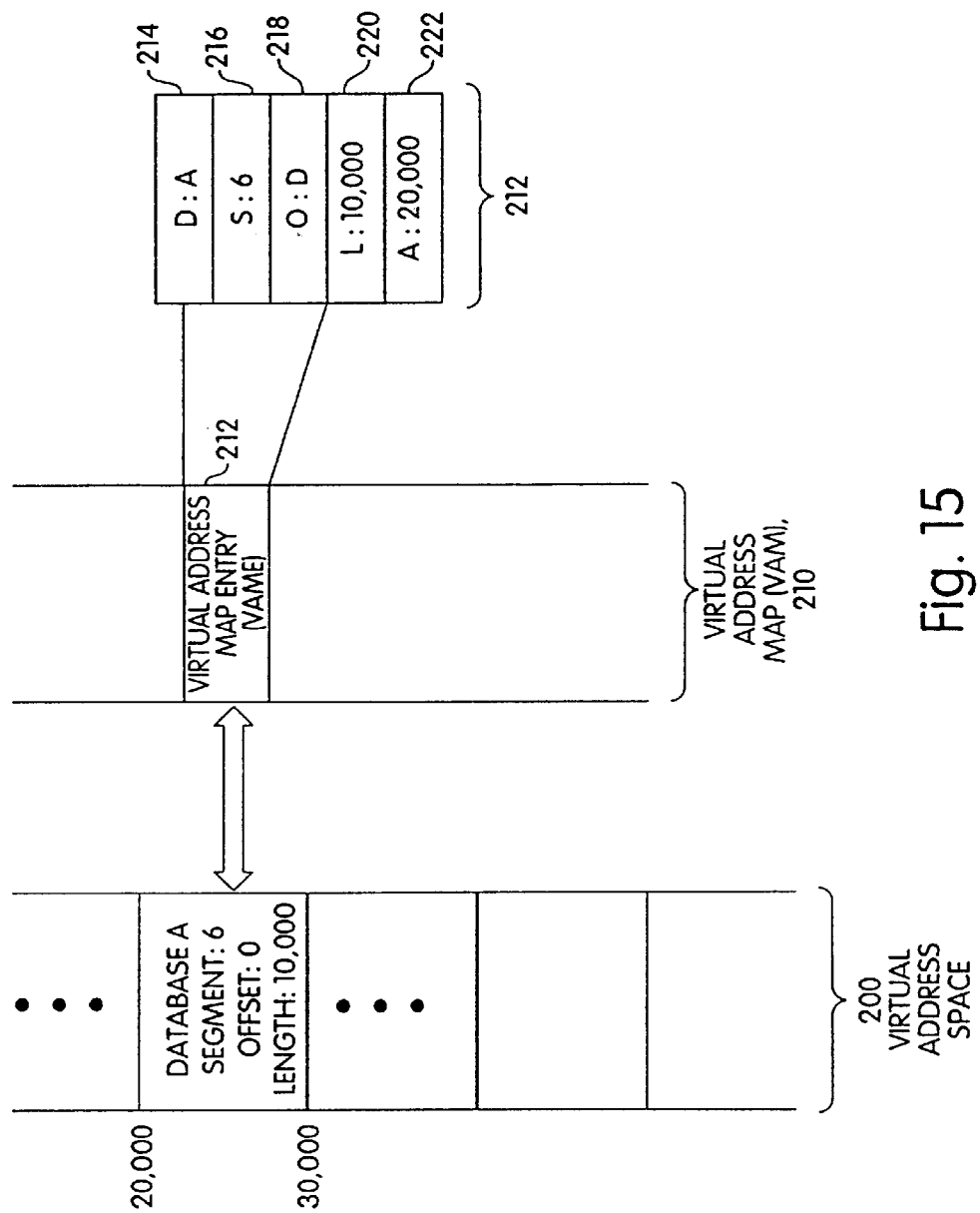
FIG. 15 is a diagram illustrating the assignment of virtual address space to database segments.

After data is brought into a client's cache memory 56, that data must be assigned locations in the virtual address space 200 of the client computer CPU, as illustrated in FIG. 15, before that data can be mapped to the virtual memory to be used by a client application. Assignment constructs a virtual address map 210 with entries 212 which indicate which database, segment, offset and length (or database pages), are assigned to a certain portion of the virtual address space.

Virtual address map entries (VAME) 212 are similar to the entries 152 of the persistent relocation map 150 (see FIG. 7). The virtual address map indicates the regions of the virtual address space to which database pages are assigned, while the persistent relocation map indicates the regions of the persistent address space to which database pages are assigned. Each entry 212 contains a database field 214 indicating the database in which a set of pages resides, a segment field 216 indicating the segment of that database in which the set is located, and an offset field 218 indicating the offset or distance in addressable units (bytes) from the beginning of the segment at which the assigned set of pages begins. There is also a size field 220 indicating the length of the set of pages or the number of pages. Finally, there is an address field 222 which indicates the virtual address which is assigned to the first addressable location of the set.

Figure 16:
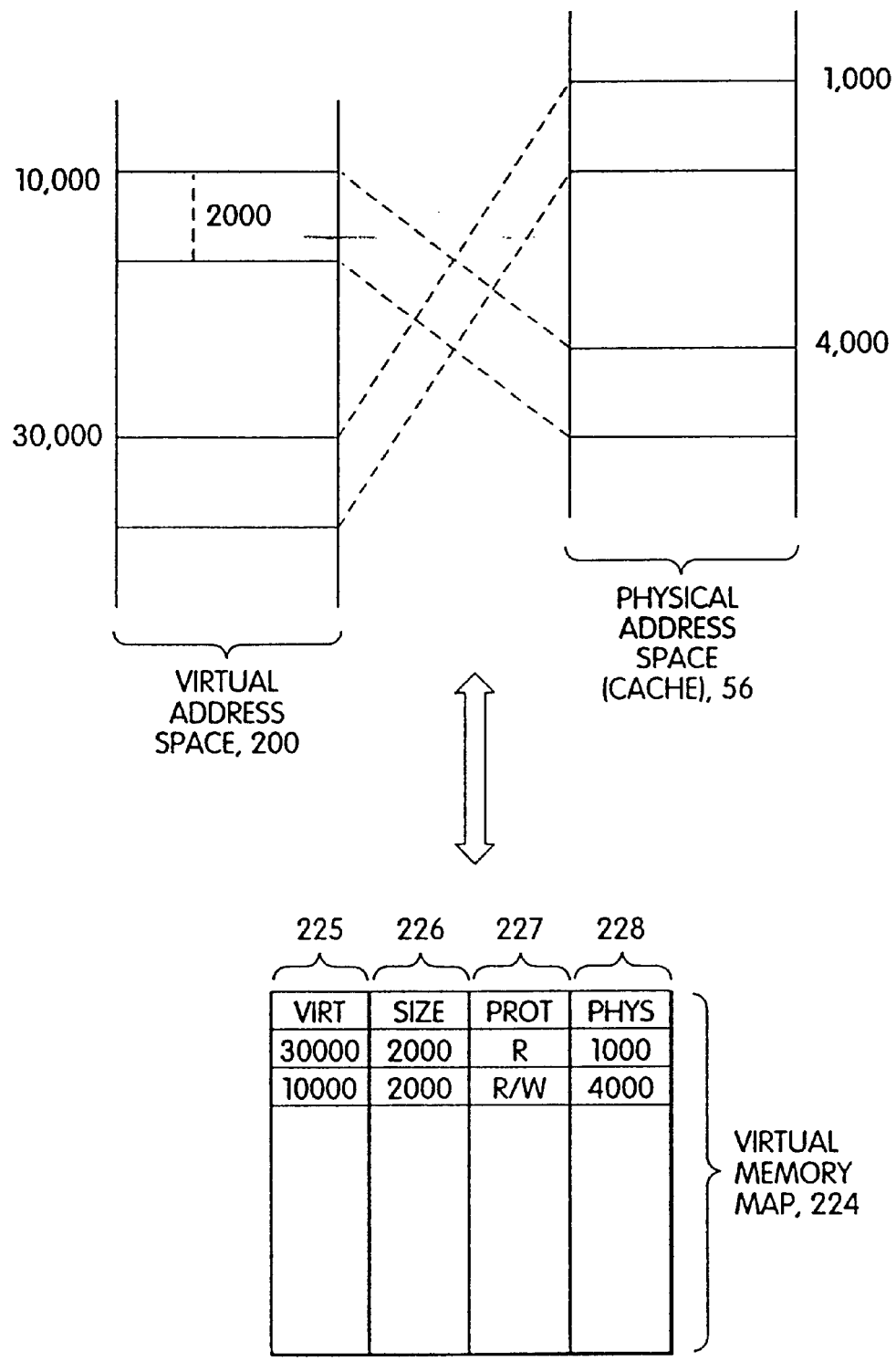
FIG. 16 is a diagram illustrating the mapping data into virtual memory (physical addresses of the cache to virtual addresses).

In order for an application to access data segments in the cache, that data must be mapped to virtual memory. FIG. 16 illustrates schematically the relationship of the virtual address space 200 to the cache 56 (physical address space) after mapping by the client computer has been performed. A virtual memory map 224 is constructed by the operating system 68 of the client computer, in a manner which is typical for most computer systems. The virtual memory map indicates the physical addresses to which the virtual addresses are mapped. A virtual memory map typically has an entry for each page including a virteal address 225, a length 226, its corresponding physical address location 228 and the read or write protection state 227 of that page.

FIGS. 17A–17C illustrate the relationship among the cache directory, the virtual address map and the operating system's virtual memory map. The cache directory 180 (FIG. 13) indicates the physical address (page frame) in which a database page is found in cache memory 56. The virtual address map 210 (FIG. 15) indicates the virtual address to which a database page is assigned, or to which it will be mapped if used by an application. The virtual memory map 224 (FIG. 16) is constructed by the operating system from information given it by the VMMDB from the cache directory 180 and the virtual address map 210. The VMMDB instructs the operating system to map a database page into virtual memory, giving it the physical address, in which the database page is located, from the cache directory 180 and the virtual address, to which it is to be mapped, from the virtual address map 210.

Figure 18:
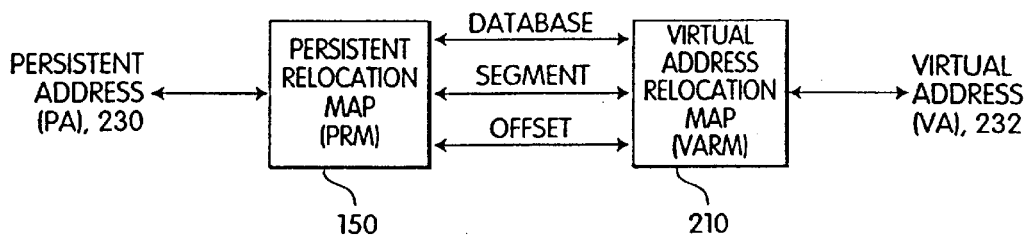
FIG. 18 is a diagram illustrating the method of relocating a permanent address to a virtual address.

When a database page is in the cache but is not mapped into virtual memory, pointers in the page contain persistent addresses. When a database segment is mapped into virtual memory these pointers need to be translated from persistent addresses into their corresponding virtual addresses before the application can use the data. This translation normally takes place before the actual mapping of the page into virtual memory. The translation procedure, also called "relocation", is schematically illustrated in FIG. 18.

Given a persistent address 230 found in a database page, the persistent relocation map 150 of the information segment 78 corresponding to the data segment 76 containing this page is searched for an entry corresponding to this address. That is, the location to which this persistent address 230 points is identified by an entry in the persistent relocation map 150 and the corresponding database, segment and offset is retrieved. The database, segment and offset can then be used to find the corresponding entry in the virtual address relocation map 210 from which the correct virtual address 232 can be obtained.

Figure 19:
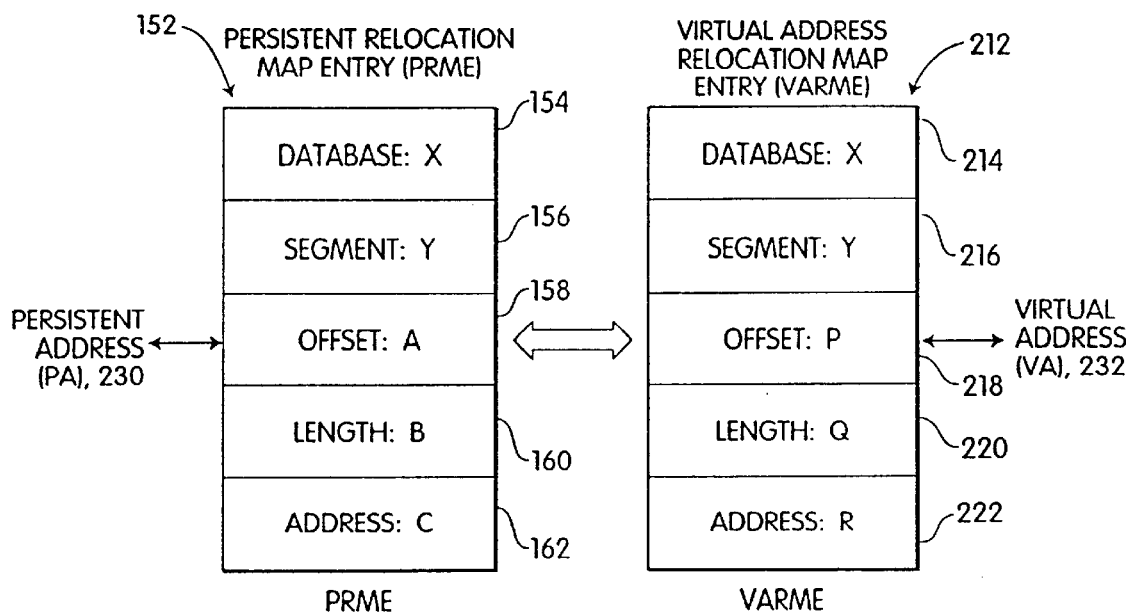
FIG. 19 is a detailed representation of the mapping of a persistent address to a virtual address.

FIG. 19 describes relocation in more detail. Given a persistent address PA 230, a persistent relocation map entry PRME 152 is found such that the value C of address field 162 is less than or equal to PA, which in turn is less than the sum of the address C and the length B of the page, ($C \leq PA < C+B$). Thus, the persistent address PA points to an addressable location within the page of the PRME. Next, the offset, in addressable units, of this persistent address PA (PA.offset) from the beginning of this segment database segment is calculated by the sum of the value A of offset field 158 and difference of the address C and the persistent address PA (PA. offset=PA−C+A).

The database X, segment Y and the offset of the persistent address PA.offset are then used to find a corresponding virtual address map entry (VAME) 212. The corresponding VAME is the one for which the offset of the persistent address (PA.offset) is greater than or equal to the value P of the offset field 218 but less than the sum of that offset P and the value Q of the length field 220 of that entry. ($P \leq PA.offset < P+Q$). The offset of PA. offset from the beginning of the page described by this VAME (to be called VA.offset) is the difference of the offset P and PA.offset, (VA.offset=PA.Offset−P). This offset (VA.offset) is then added to the value R of the address field 222, which indicates the virtual address of the first addressable location of this page of this database segment. Thus, the virtual address (VA) corresponding to the persistent address PA 230 is found (VA=VA.offset+R).

In order to translate a virtual address to a persistent address, the opposite procedure is followed.

The detailed operation of the virtual memory mapping database system and method using the previously described data structures will now be described in conjunction with the flowcharts of FIGS. 20–35.

Figure 20:
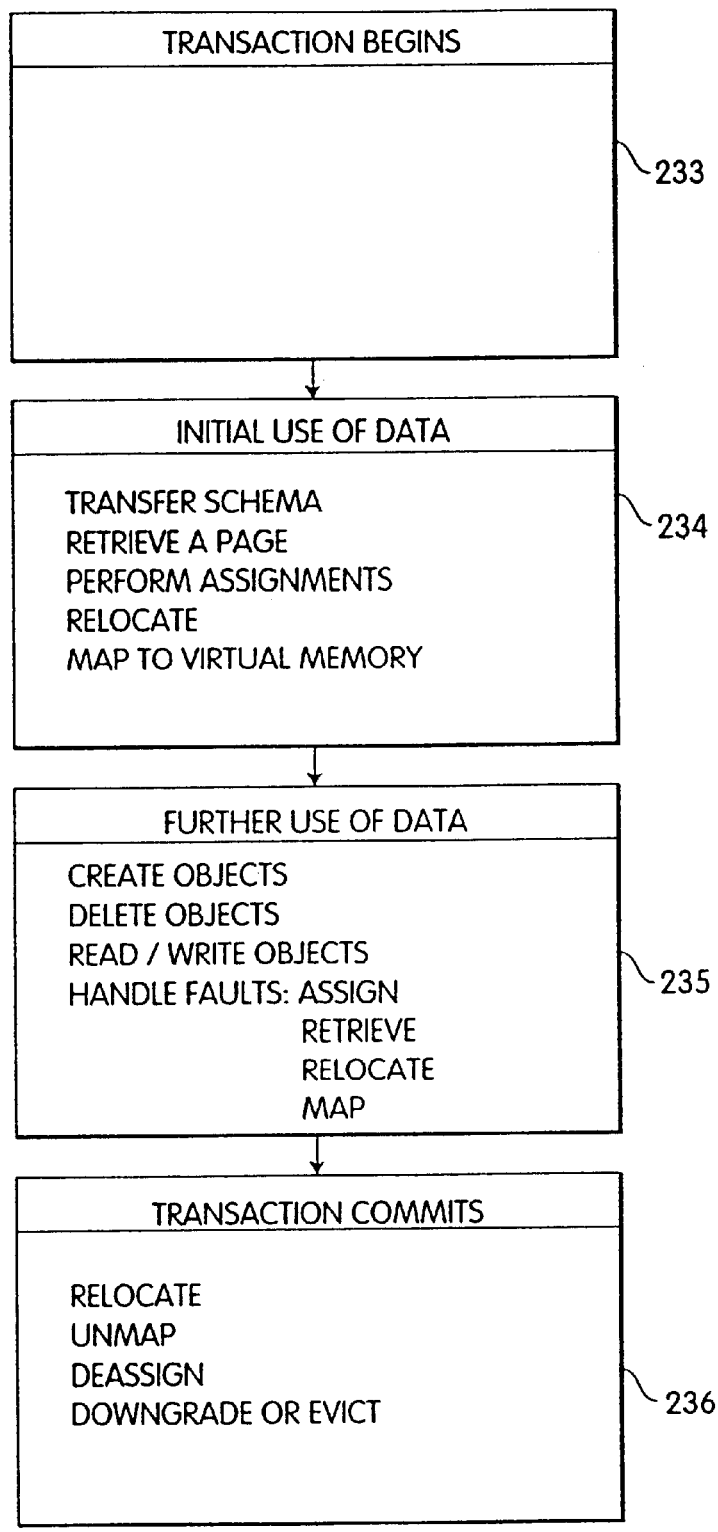
FIG. 20 is a simplified flowchart illustrating various possible steps of a transaction.

FIG. 20 is a general diagram of the processes occuring during a transaction by an application program. An application begins a transaction with step 233 which indicates the beginning of a transaction to the VMMDB. After an undetermined amount of time, it is assumed that the application will make an initial access to a database (step 234). This step of initial access to a database is described in further detail in FIG. 21, and includes the steps of transferring the schema, performing initial assignments, retrieving the data from the server, and relocating and mapping the retrieved data into virtual memory. After the initial use of data during step 234, further use of the data (step 235) may be made. Use of data can include creating, deleting, reading and writing objects. Also, virtual memory faults may occur, indicating that a virtual address has been assigned to a page, but that the page has not been mapped into virtual memory. The fault further indicates that data may need to be retrieved from the server, some segments may need to be assigned virtual addresses and/or data in the cache may need to be mapped into virtual memory. These steps of creating, deleting, and fault handling are described in connection with the description of the following flowcharts. Finally, when a transaction is committed (step 236) pages used in such transactions are relocated outbound (i.e. PA's are substituted for VA's), unmapped and unlocked. Where required for reasons discussed later, the pages may also be downgraded or evicted.

Figure 21:
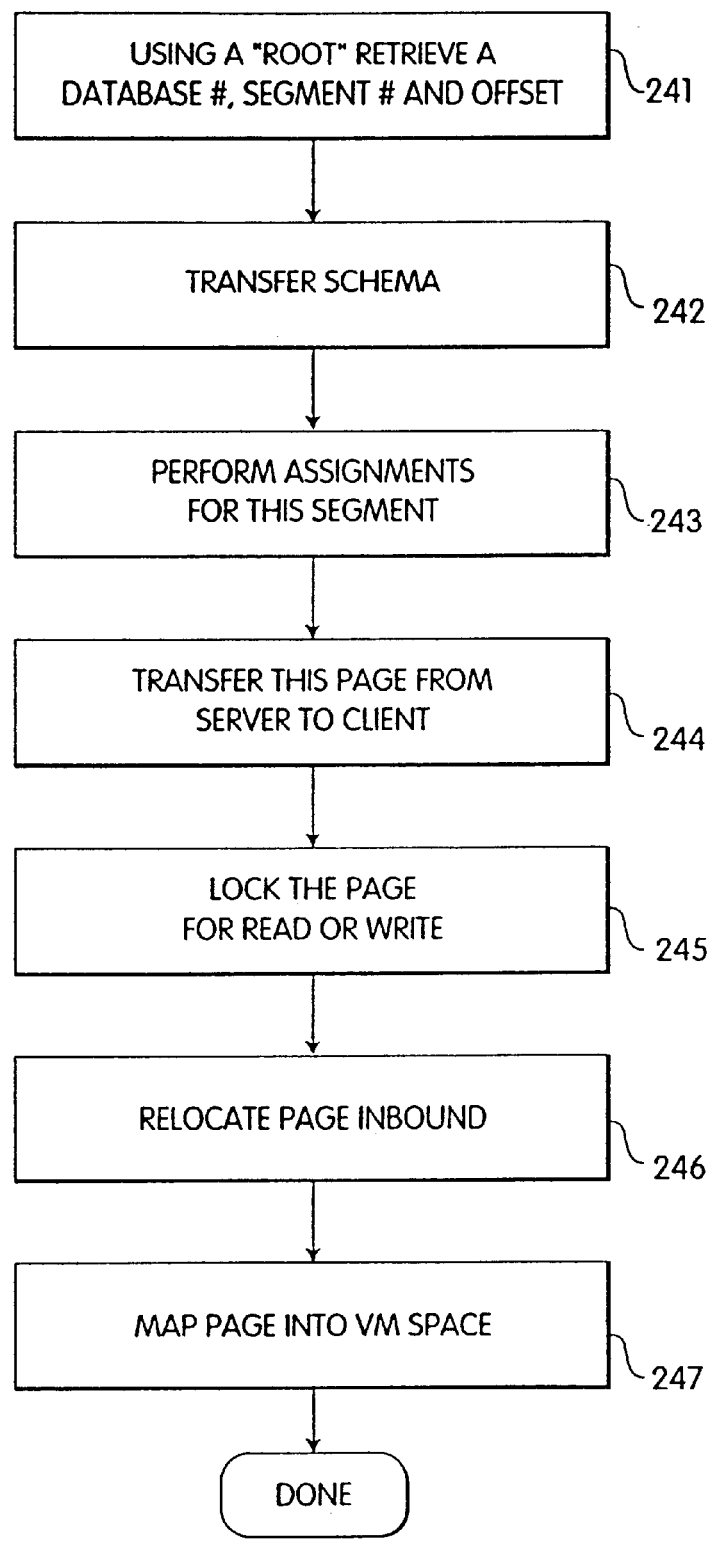
FIG. 21 is a flowchart describing how an initial access to a database is handled by a client computer.

FIG. 21 is a flowchart describing the process of initial access to a database for reading or writing data. First of all, an application requests access to an object in a database from a server. A pointer to that object is retrieved in step 241 in any known way from which the database, segment and offset of the object can be found. Given the pointer to a desired object, the server computer can then transfer the schema 120 (FIG. 10) of the database in which the object resides to the client computer during step 242. This schema provides information about the data types of this database. Before data can be used, virtual address assignments need to be performed (step 243) for the segment containing the selected page and the page needs to be retrieved at and transferred from the server (step 244) for read or write access. It is preferable to perform assignments first, then read the page from the server in the preferred system for utilizing the invention. Assignment and retrieval must be performed before the page is relocated, mapped and/or locked. In FIG. 21, locking is performed during step 245, but can also be performed between or after relocation and mapping. A page is relocated inbound (step 246). That is, the pointers in that page are translated from persistent addresses to virtual addresses. Finally, the page is mapped into virtual memory, step 247, and the application program can use the data. Given this initial assignment and mapping, other accesses to this database will cause any other necessary assignments and mappings to be performed. This initial access procedure needs to be performed for each database accessed by an application. However, assignments are only performed for the accessed segment using the PRM of that segment and only the accessed page is relocated and mapped into virtual memory.

Figure 22:
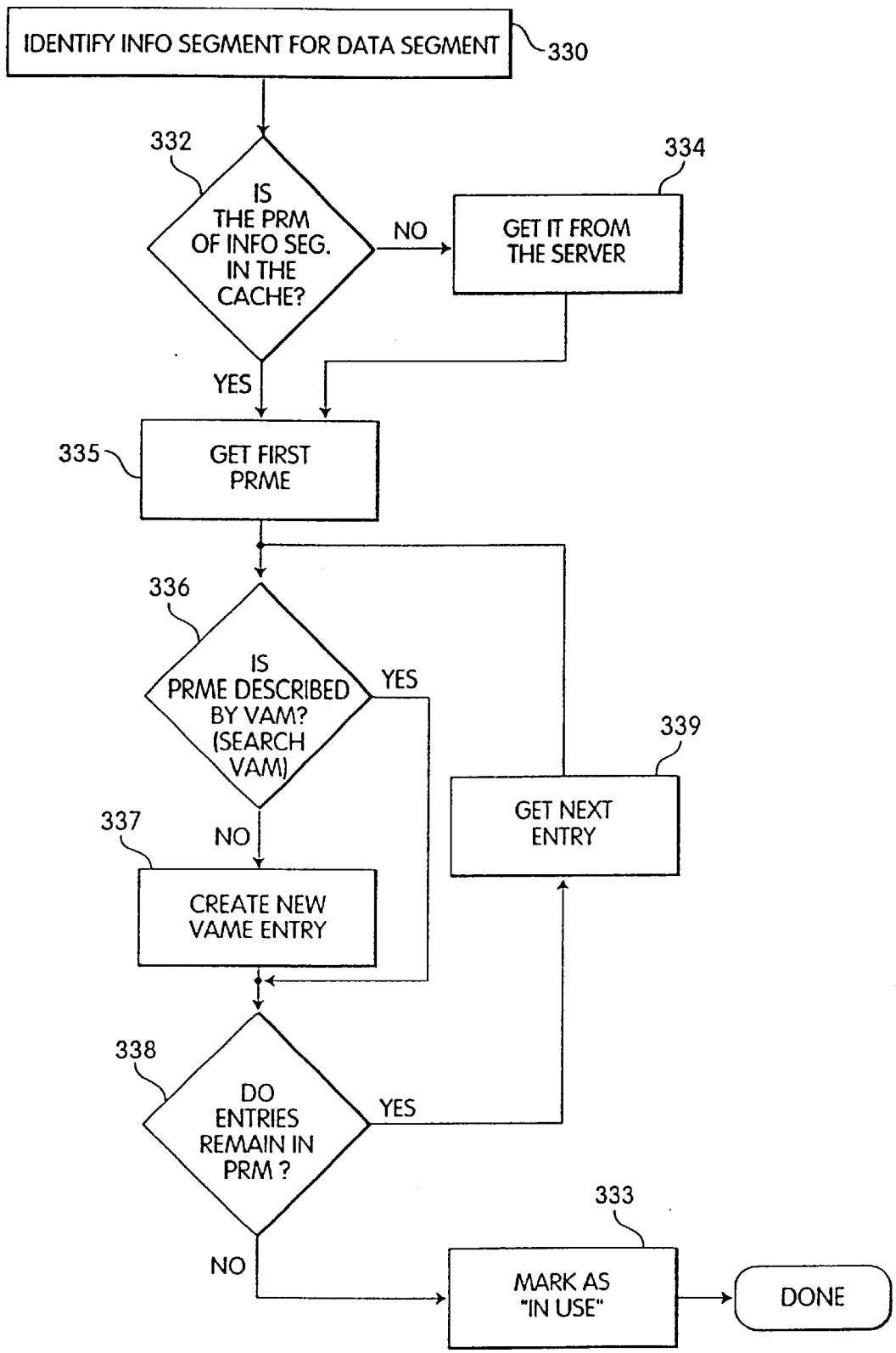
FIG. 22 is a flowchart describing the method of assigning virtual addresses to database segments.

FIG. 22 illustrates the method of performing assignments for a segment. The first step 330 of assigning a database segment 78 to the virtual address space 200 is identification of the information segment 76 associated with the data segment to be assigned. Next, the cache directory 180 (FIG. 13) of the client 40 is examined (step 332), in order to determine if the persistent relocation map 150 (PRM) of the identified information segment 178 is currently in the client's cache 56. The PRM may be in the client cache if the segment had been previously accessed by the client. If the PRM 150 is not found in the cache directory 180, the pages of the information segment 78 which contain the PRM are retrieved from the server (step 334). This step of retrieval from the server and storage at the cache is performed in a manner to be described later in connection with FIG. 23 describing retrieval of a data segment. After the PRM is retrieved, the first PRM entry 152 is accessed (step 335), this step being performed at the client. For each entry 152 in the PRM 150, the virtual address map (VAM) is searched (step 336) to determine if the range of addresses in the PRM 150 is described by the VAM 210. If an entry 152 of the PRM 150 is described by an entry 212 of the VAM 210, the PRM is checked (step 338) to determine if entries remain. If the entry is not found, before going onto step 338 a new entry 152 in the VAM 210 is created (step 337), and a new range of heretofore unused virtual addresses is allocated according to the database 154, segment number 156, page offset 158 and length 160 of the PRM entry 152. When initial assignments are performed, there are no entries 212 in the virtual address map (VAM) 120, and all new VAM entries 212 are created.

If no entries remain in the PRM (in step 338) assignment is completed. If entries remain, the next entry is retrieved (step 339) and the virtual address map is searched for a corresponding entry as described above (step 336). Steps 336–339 are then repeated until a "No" output is obtained during step 338. The "in use" field 185 of the cache directory entry for this segment can then be set.

Figure 23:
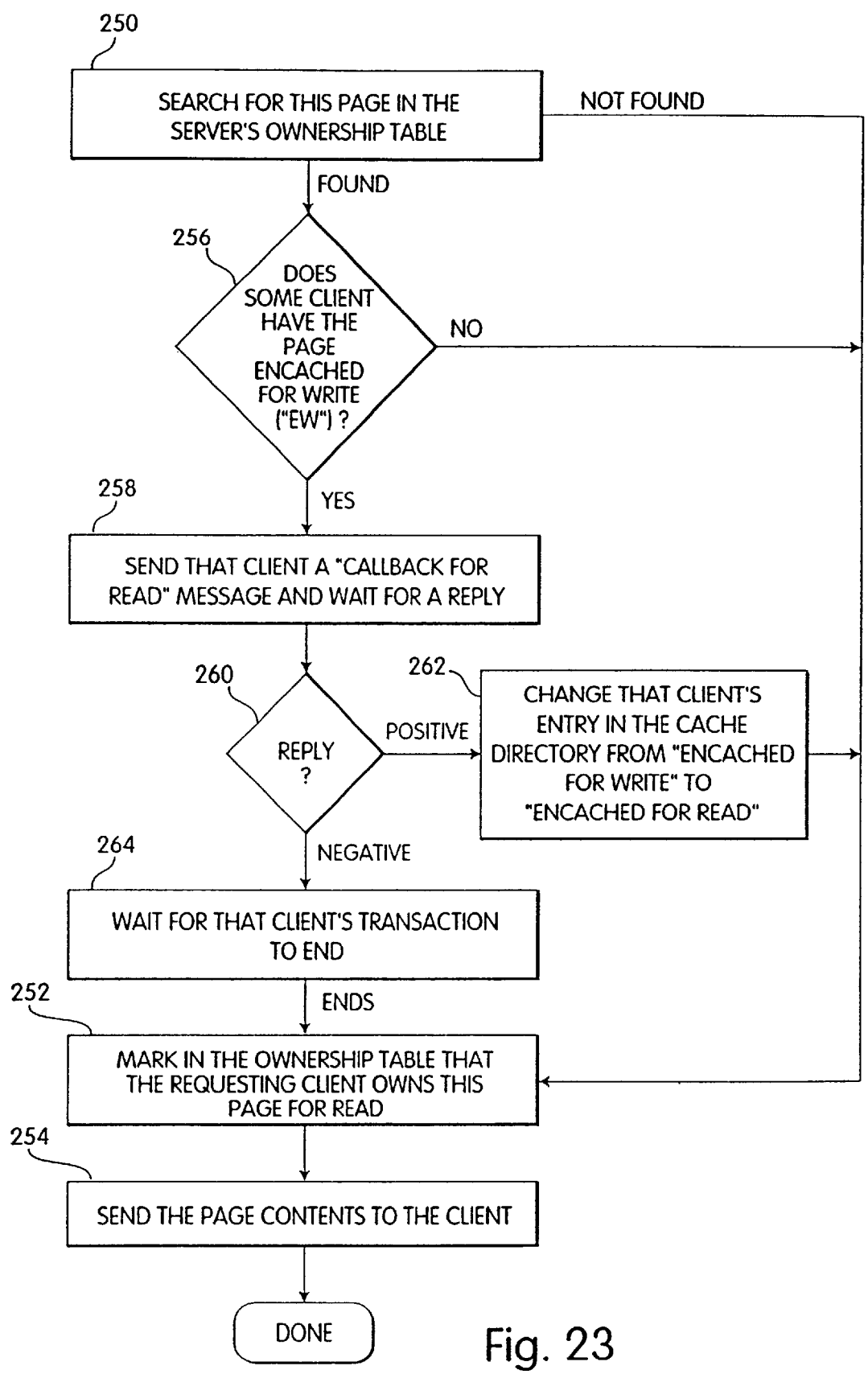
FIG. 23 is a flowchart describing how a server handles a request from a client to read a page for read access.
Figure 24:
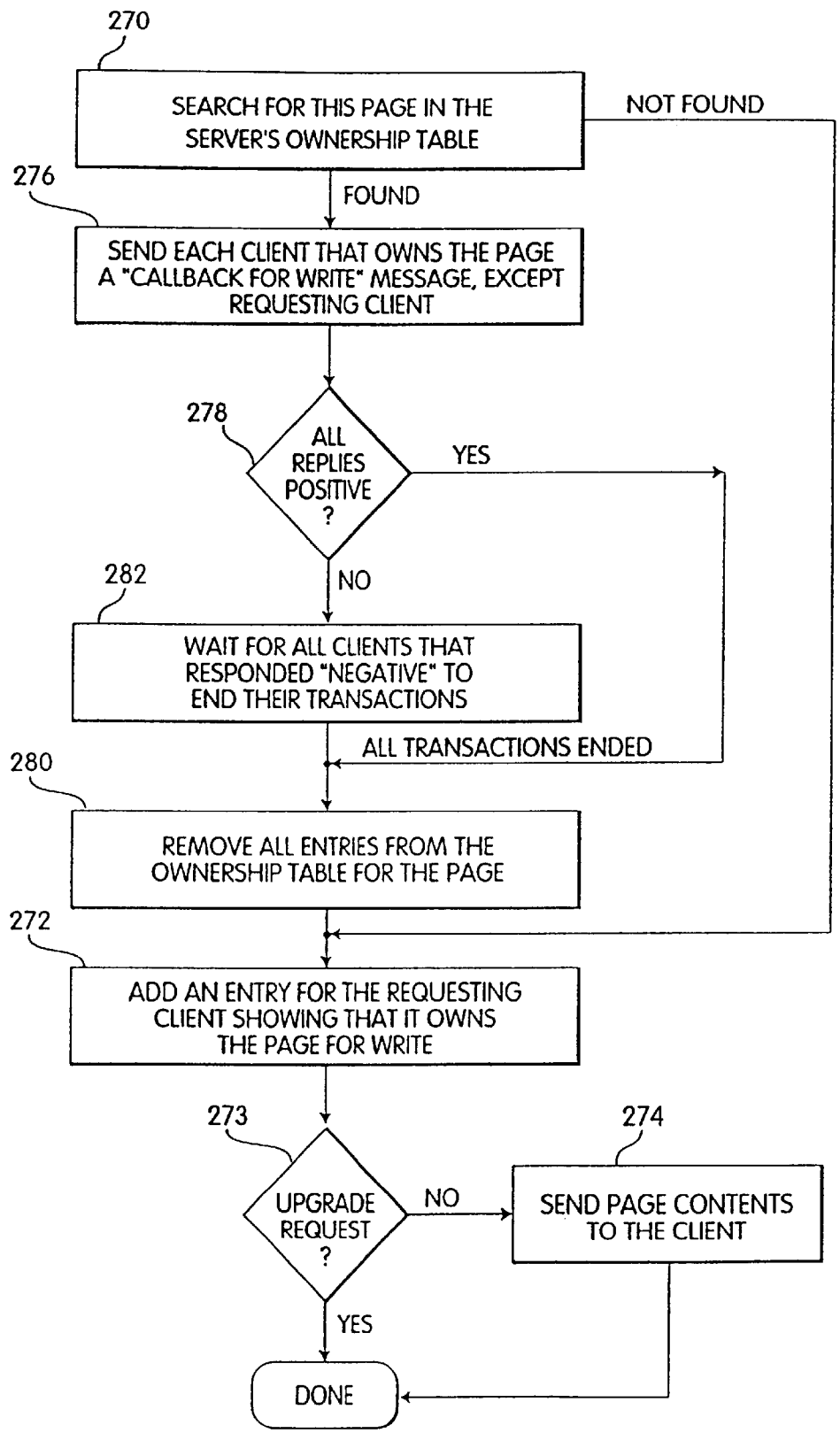
FIG. 24 is a flowchart describing how a server handles a request from a client to read a page for write access.

Either before or after assignments are made for a database segment, a page from the data segment will need to be read from the server, either for read access or for write access. The process of loading a page of a database for read access is illustrated in FIG. 23. The process of loading a page for write access is illustrated in FIG. 24.

Referring to FIG. 23, a server 44, in handling a request from a client 40 for a page for reading, first searches (step 250) for an entry 192 (FIG. 14) for this database in its ownership table 190. If the page is not found in the server's ownership table, an entry 192 is then made (step 252) in ownership table 190 indicating that this page is now encached for read by the requesting client 40. Step 252 of making an entry is followed by the step 254 of sending the page contents from the server to the client 40.

If searching step 250 finds the requested page in ownership table 190 at the server, the server then proceeds to step 256 to determine whether a client 40 has the requested page encached for write by examining field 198 of the ownership table. If the page is not encached for write by any client, the requesting client 40 can encache the page for read. Recall that more than one client can have the page encached for read at any given time; however, only one client can have a page encached for write. If the client is able to encache the page for read, the server 44 continues to step 252 either to make an entry in its ownership table, if there is none, or to add a client to the list of clients in the current entry. Processing continues with step 254 to send the page contents to the client 40.

However, if any client has the page encached for write, the server 44 proceeds to step 258 to send that client a message known as a call back message, indicating that another client 40 wishes to access the page for reading. During step 260, the server waits for a reply. The step 258 of sending a client 40 a message and the step 260 of waiting for a reply is explained in more detail later in connection with FIG. 25.

When a reply is received from the queried client, it is evaluated by the server during (step 260). If the reply is positive, indicating that the page is no longer encached for write at that client but is rather encached for read, the entry in the ownership table 190 of the server 44, corresponding to that client and the requested database page, is changed (step 262) from "encached for write" status to "encached for read" status]. Changing the ownership table 190 (step 262) is followed by the step 252 of adding the requesting client 40 to the list of clients in the entry for that page in the ownership table, and the step 254 of sending the page contents to the client.

If the reply during step 260 is negative, indicating that the queried client 40 is still using the page which it has encached for write, the server 44 waits for that client to end its transaction (step 264). As will be described later, in conjunction with FIG. 35 when that client ends its transaction, the entry 192 for that page and queried client 40 in the ownership table 190 of the server will be changed from "encached for write" to "encached for read" and the server can continue with steps 252 and 254 of marking the entry in the ownership table indicating that the requesting client has this page encached for read, and then sending the page contents to the client.

When the client 40 receives and encached a page from a server, an entry 186 is made in the cache directory 180 (FIG. 13), at that client 40, indicating the page frame (physical address) into which the contents of the page are placed, the encached status of the page and the lock status of the page.

FIG. 24 describes the procedure for handling a request from a client for a page from a server's database for write access, this procedure being similar to the procedure followed by the server for a read access request. This procedure is also followed when a page by is upgraded from read to write. The first step 270 of searching for an entry 192 for the requested page in the ownership table 190 of the server is similar to the step 250 performed for a read request. If no entry is found during step 270, an entry is added to the ownership table, (step 272) indicating that the requesting client 40 now has the page encached for write. The page contents are then sent to the client 40, during step 274, except if the request is for an upgrade as determined in step 273.

If, during step 270, the search for an entry 192 for the requested page in the server's ownership table 190 is successful, (i.e. a client 40 has that page in its cache 56), a message is sent to each client that owns the page except the requesting client (step 276), instructing that client to return that page. The method of sending this message to the client is described in more detail later in connection with FIG. 26. The operation then proceeds to step 278 during which the server 44 receives and evaluates replies from each client 40 to which it sent a message. If all of the replies are positive, indicating that no client has the page locked for use, the operation proceeds to step 280 to remove all clients from the entry 192 for this page from the ownership table 190 of the server 44. However, if there are any negative replies, the server waits for all of the clients 40 that responded negatively to end their transactions (step 282). After a client 40 ends its transaction, a message is sent to the server 44 indicating that the client has removed the page from its cache. When all clients end their transactions, the server proceeds with step 280 as if all replies were positive. The server 44 removes all entries 192 for that page from its ownership table 190 in step 280; then, continues by adding an entry to the ownership table for the requesting client 40 (step 272) indicating that the requested page is encached for write at that client 40. Finally, the page contents are sent (step 274) to the client 40 if the client 40, except if the request was for an upgrade as determined in step 273.

Figure 25:
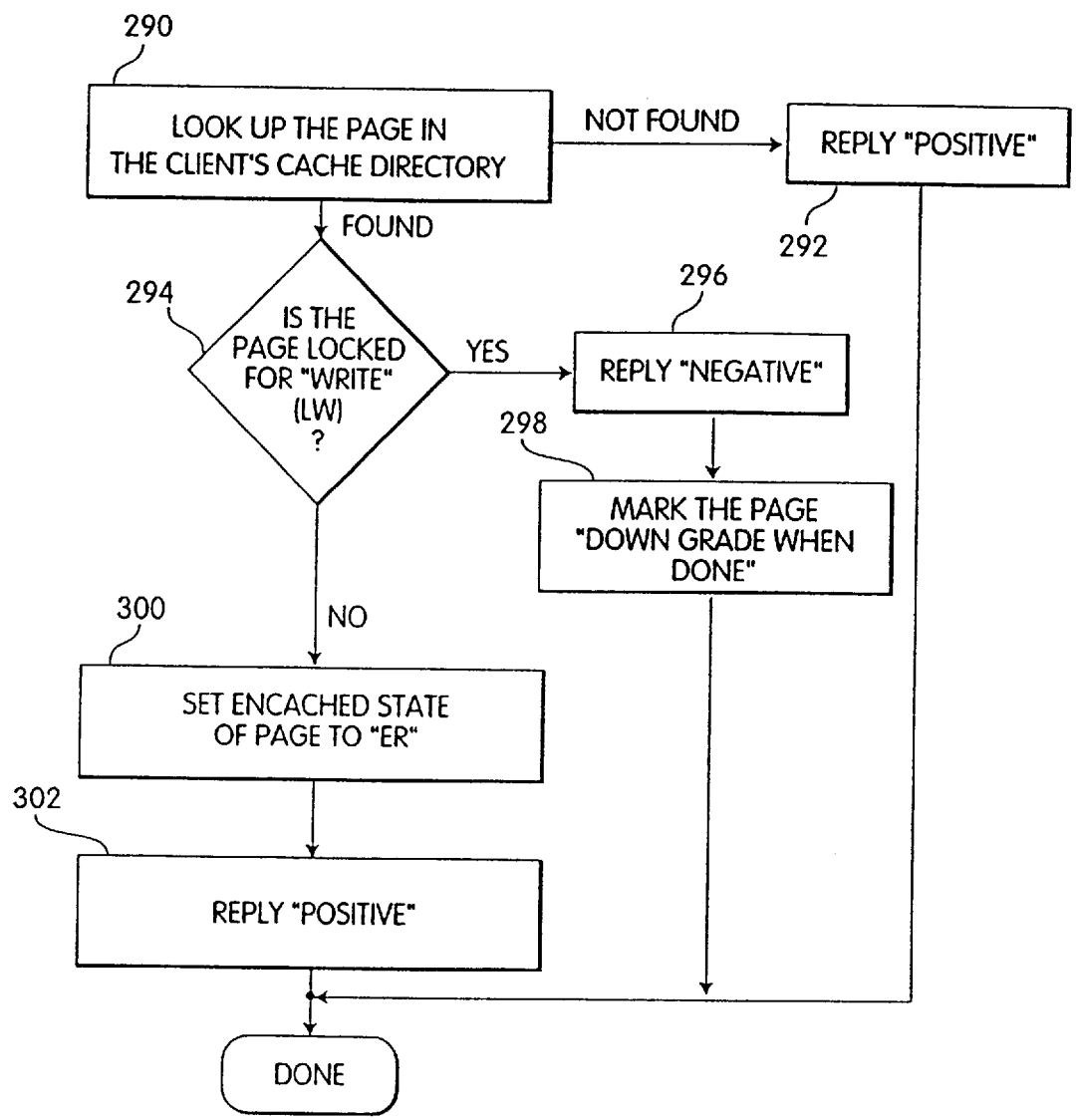
FIG. 25 is a flowchart describing how a client handles a command to return a page which another client needs to read.

FIG. 25 illustrates how a client computer 40 handles a message from a server computer 44 indicating that a page in the cache 56 of that client 40 is requested by another client 40 for read access. When a client 40 receives a "call back for read" message, the client's cache directory 180 is searched for the requested page (step 290). If the page is not found in the client's cache directory 180, a positive reply is sent to the server 44 during step 292. The manner in which the server 44 handles the positive reply was described above. When an entry 186 for the page is found in the cache directory 180 at the client 40, the lock status field 178 of that cache directory entry is examined during step 294 to determine if the page is locked for write by the queried client. If the page is locked for write by that client 40, a negative reply is sent to the server 44 during step 296. The server 44 then waits for this client 40 to complete its transaction as described above. The client computer also marks the page "downgrade when done" during step 298. Thus, when the transaction commits (ends) at the client 40, the server 44 is informed and control of this page is relinquished. The encached state of the page is changed from "write" to "read".

If a page that is encached for write is not locked for write, the encached state of the page is set to "encached for read" in the field 178 of cache directory 180 (step 300) of client 40. The client 40 then sends a positive reply to the server 44 during step 302. The server handles this reply in the manner described above; in particular, it changes that client's entry 192 in its ownership table 190 from "encached for write" to "encached for read".

Figure 26:
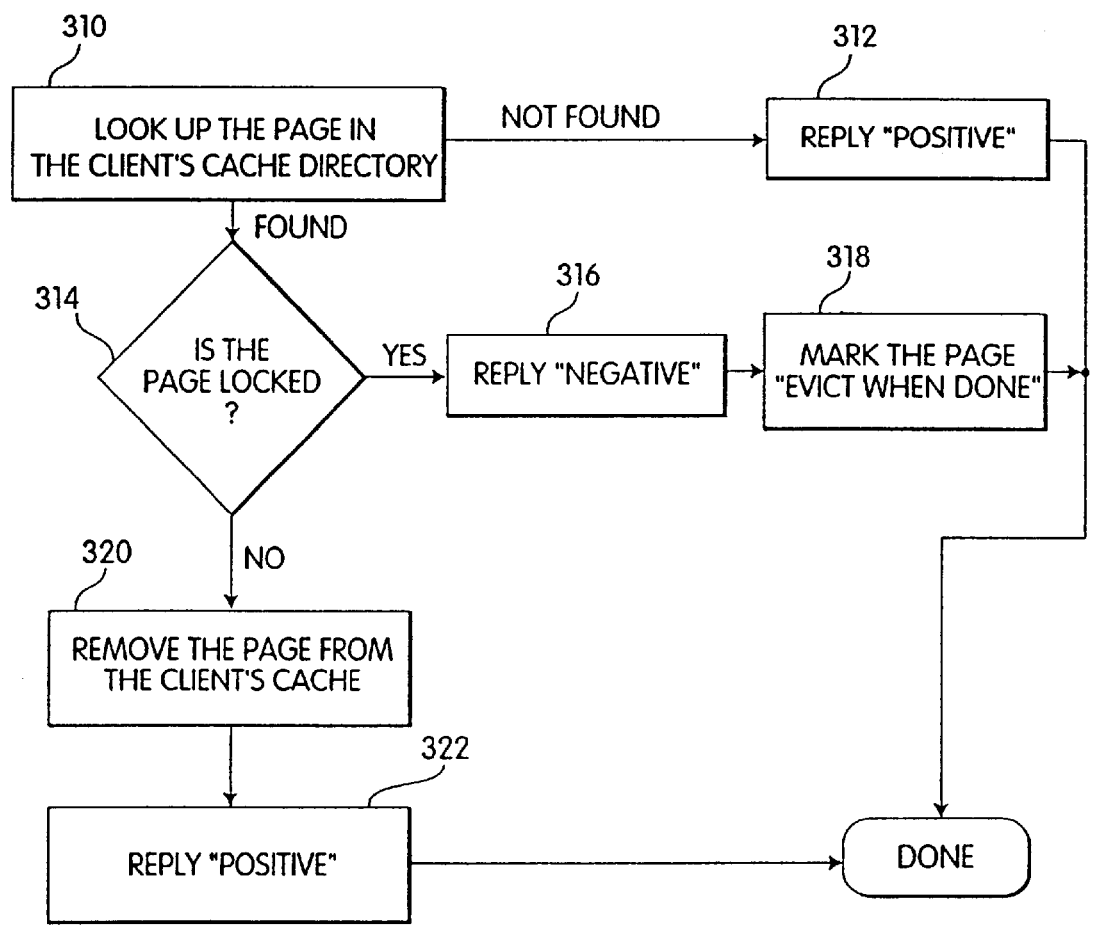
FIG. 26 is a flowchart describing how a client handles a command to return a page which another client needs for write access.

FIG. 26 illustrates how a client 40 handles a "call back for write" message from the server 44. During step 310, the first step in this operation, the "call back for write" message causes the client computer 40 to find the entry 186 that corresponds to the requested page in the client's cache directory in the same way as done for a "call back for read" message, (step 290). If an entry 186 for that page is not found in the client's cache directory 180, a positive reply is sent to the server 44 during step 312. This positive reply is handled by the server in the manner described above. If an entry 186 for the page is found in the client's cache directory 180, the operation proceeds to the step 314 of examining the lock status field 178 of the entry 186 to determine if that page is locked for use (either for read or write). If the page is locked, a negative reply is sent to the server 44 (step 316). The server then waits as described above, and during step 318, the entry 186 for this page in the client's cache directory 186 is marked "evict when done." Thus, when this client commits (ends) its transaction, the client 40 will remove the page from its cache 56 as described in conjunction with FIG. 35 and the entry 186 in its cache directory 180 for this page and will inform the server 44 that the page is now available.

If the entry 186 in the cache directory 180 for the requested page indicates that the requested page is not locked, the page is removed from the client's cache 56 and cache directory during step 320 and a positive reply is sent during step 322. The server 44 handles the positive reply in the above-described manner.

Transfer of database pages into the cache 56 of a client 40 is normally performed after assignment of the page to the virtual address space. Relocation of pointers and mapping of the cache to virtual memory is performed after assignment and transfer.

The process of relocating, or translating, pointers in a page between persistent and virtual addresses will now be described in more detail in connection with the flowcharts of FIGS. 27 through 30.

Figure 27:
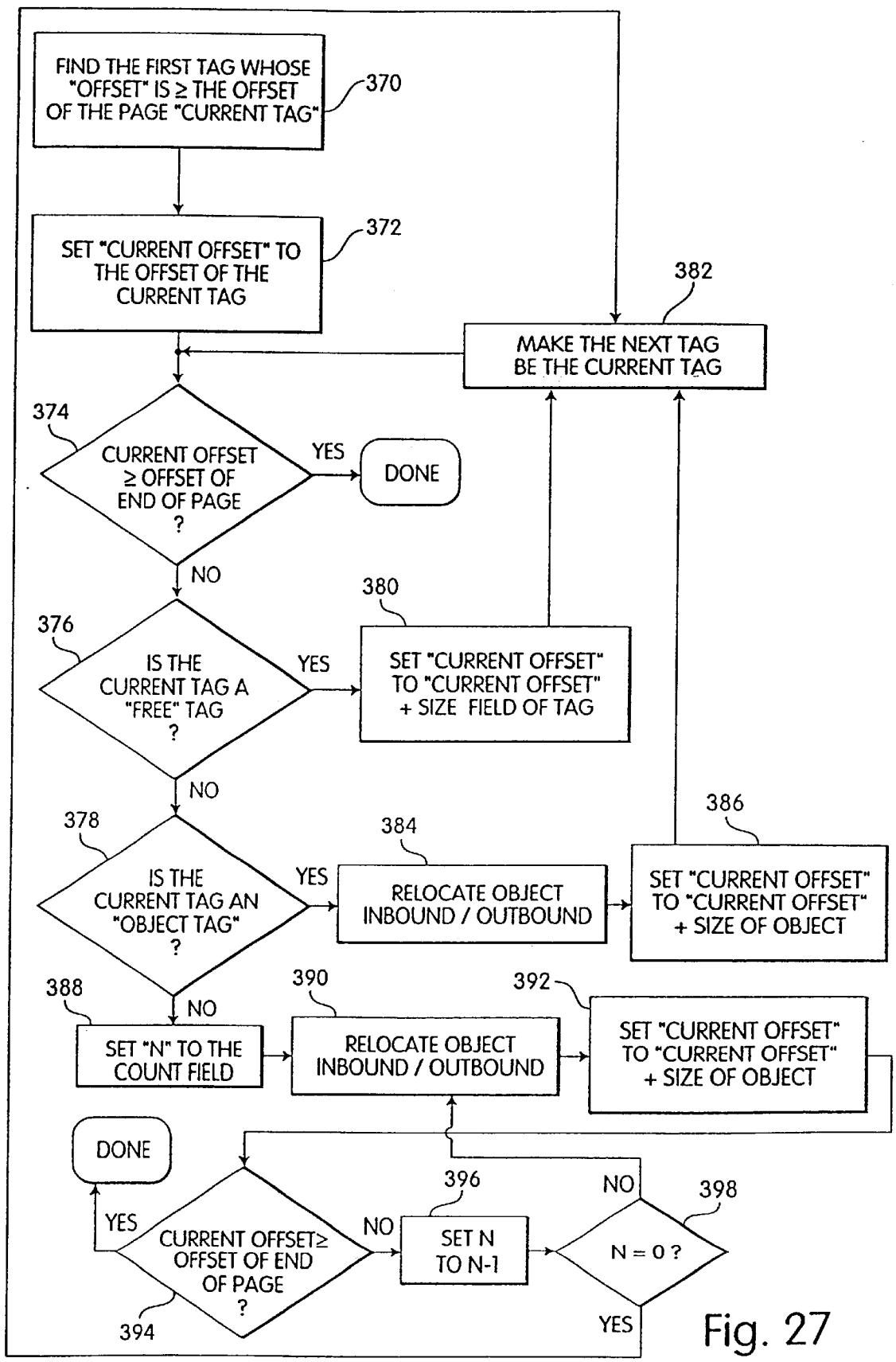
FIG. 27 is a flowchart describing the method of relocating a page of data.
Figure 28:
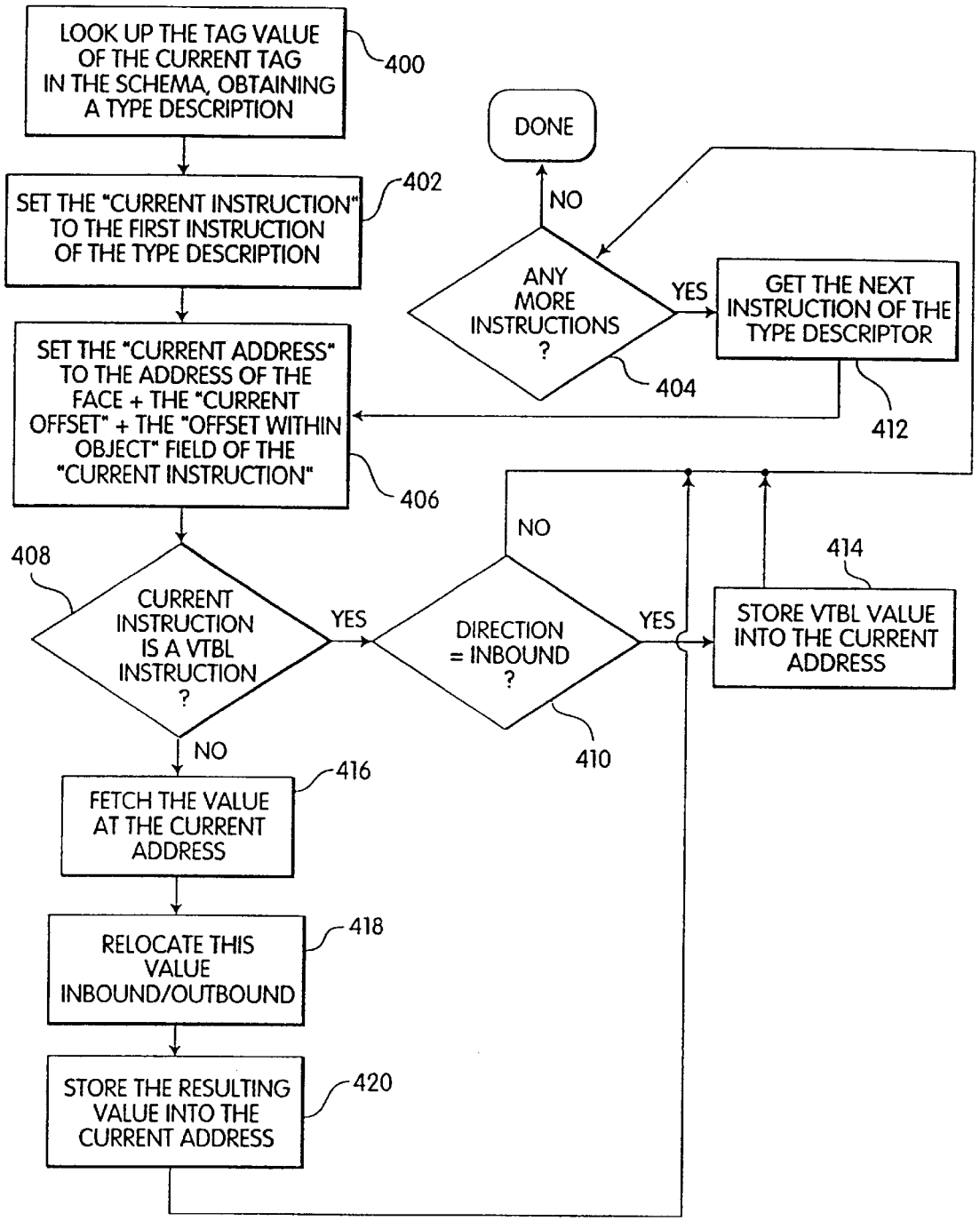
FIG. 28 is a flowchart describing the method of relocating an object.
Figure 29:
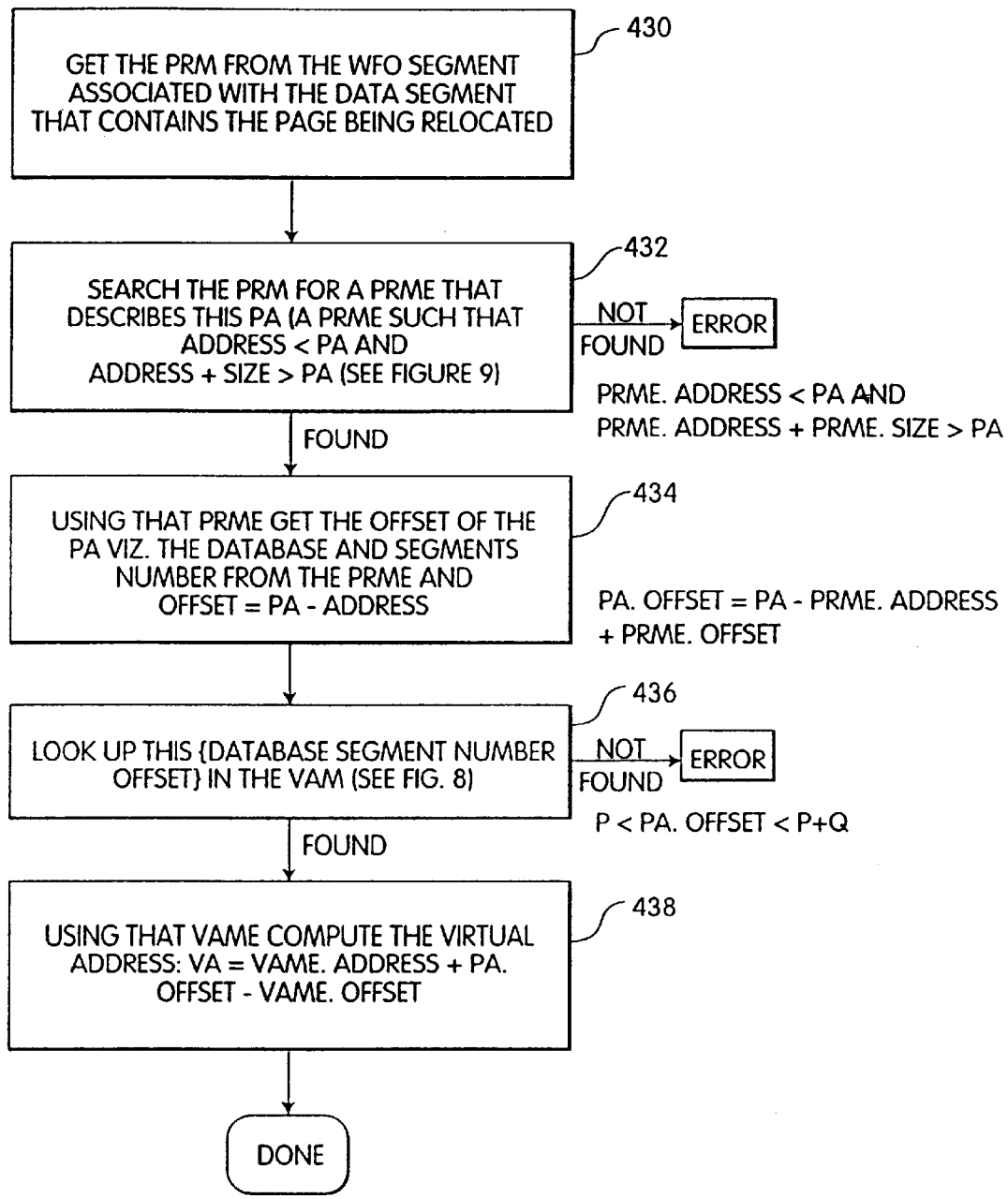
FIG. 29 is a flowchart describing the method of relocating a value inbound.

The process of relocating a whole page 80 (FIG. 6) is illustrated in FIG. 27. The general method of this procedure includes the steps of finding each object 82, 84, 86 (FIG. 8) in a page, determining where pointers are located in those objects, and then translating those pointers from their persistent addresses to virtual addresses. To locate objects 82, 84, 86 in a page 80, the information segment 78 corresponding to the desired data segment 76 is searched in step 370 to retrieve the first tag 88, 90, 92 in the tag table 94 whose corresponding object is in the desired page. The retrieved tag 88, 90, 92 is called the "current tag". The offset of the current tag (the offset from the beginning of data segment 76) is called the "current offset" and is set during step 372.

The current offset is compared, in step 374, to the offset of the end of the page. If the current offset is greater than the offset of the end of the page, relocation of that page is complete. Otherwise, the tag 88, 90, 92 is examined in steps 376 and 378 to determine the type of object to which it corresponds. If the current tag is determined in step 376 to be a free tag 92, the current offset is increased during step 380 by the value found in the size field 114 of that free tag. The next tag is then retrieved in step 382 and the current tag is set to this new tag. Relocation continues as described above with comparison step 374.

If the current tag is determined, in step 378, to be an object tag 88, that object 82 is then relocated in step 384. Relocating an object 82 involves relocating pointers in a given object in a manner to be described later in conjunction with FIG. 28. When an object 82 has been relocated, the current offset is increased in step 386 by the size of that object 82. The current tag is then set in step 382 to the next tag in the tag table 94 and relocation continues as described above with the comparison step 374. If the tag is neither a free tag 92 nor object tag 88, the current tag then represents a vector tag 90. In a system using more than three tags, the flowchart would continue in a similar manner, with steps for examining each tag to determine its type.

If the current tag is a vector tag 90, a variable 'N' is set in step 388 to the value found in the count field 108 in the vector tag which corresponds to the number of objects 82 in the vector 84. The first object 82 in the vector 84 is then relocated in step 390 in the same manner as relocation step 384 (see FIG. 28). When the relocation step 390 is completed, the current offset is increased by the size of that object (step 392). The current offset is then compared to the offset of the end of the page (step 394). If the current offset is greater than the offset of the end of the page, relocation of that page is complete. If the current offset is not greater than the offset of the end of the requested page, 'N' is decremented by one (step 396). The value of 'N' is then evaluated in step 398. If 'N' is equal to zero, no objects remain in the vector 84 to be relocated, and the current tag is set (in step 382) to be the next tag in the tag table 94. If 'N' is not equal to zero, the next object in the vector is relocated 390. This process continues until either the end of the page is reached, or the last object in the vector is relocated.

The process of relocating an object, as mentioned above, is illustrated in FIG. 28 and will now be described. The type code 102, 106 of the current tag 88, 90 for the object to be relocated is found in the schema 120 (as described in FIGS. 9A–9C), in order to obtain a type description 122 (as described in FIG. 10) during step 400. For the purpose of illustration, the first instruction 130 of the type description 122 will be called the "current instruction" (step 402). Given an instruction 130, the "current address" is set, in step 406, to the sum of the address of the page, the current offset and the offset of the pointer within the object as obtained from field 134 of the current instruction 130. Next, the relocation field 132 of the current instruction 130 is examined (step 408) to determine if the pointer of that location is a pointer to be relocated or if it is a VTBL pointer. If the current instruction 130 is a VTBL instruction, and relocation is verified (in step 410) as outbound, nothing is done. The type descriptor 122 is then examined (step 404) to determine if any instructions remain. If no instruction remain, relocation of this object is complete; otherwise the next instruction 130 in the type descriptor 122 is retrieved (step 412). Relocation continues with setting the "current address" (step 406) described above. If relocation is to be performed inbound (from persistent addresses to virtual addresses), the VTBL value is stored (in step 414) into the current address before the operation proceeds to step 404.

If the current instruction 130 is determined to be a relocation instruction, during step 408, the value located at the current address is retrieved (step 416). That value is then relocated (step 418), that is, translated either from a virtual address to a persistent address or vice versa. Relocation of a value will be described later in conjunction with FIG. 29.

The new value resulting from relocation is then stored (step 420) into the current address. Processing then continues with step 404 of checking for more instructions.

Relocation of a specific value will now be described in connection with FIGS. 29 and 30, and FIGS. 18 and 19. When relocating a value inbound, or from a persistent address to a virtual address, the value retrieved using the current address is a persistent address PA. The information segment 78, associated with the data segment 76 containing the page to be relocated is retrieved in step 430 to get the persistent relocation map PRM 150 for that segment 74. The PRM 150 is then searched, during step 432, for an entry 152 that describes the current persistent address. The entry ought to exist; so if it is not found, an error message is sent or signaled. The further process of relocating inbound was previously described in connection with FIG. 19 and is recalled here.

Given a persistent address PA 230, a persistent relocation map entry PRME 152 is found during step 432 such that the value C of its address field 162 is less than or equal to the PA 230, and the sum of the address C and the value B of the length field 160 of the page is greater than the PA 230 (C≦PA<C+B). Next, the offset of this persistent address 230 (PA.offset) from the beginning of this database segment is found during step 434. This offset is the sum of the difference between address C and the persistent address PA (PA−C) and the value A of the offset field 158 (PA.offset= PA−C+A).

The database 154, segment 156 and the offset (PA.offset) are then used to find a corresponding virtual address map entry 212 during step 436. The corresponding entry 212 is the one for which the offset of the persistent address (PA.offset) is greater than or equal to the value P of offset field 218 of VAME entry 212 but less than the sum of that offset P and the value Q of the length field 220 of that entry 212 (P≦PA. offset<P+Q). The virtual address corresponding to this persistent address is then calculated in step 438. The new virtual address VA is the sum of the difference between the offset P and PA.offset and the value R of the address field 222 of that virtual address relocation map entry (VAME) 212. The address R indicates the first virtual address used for this page of this database segment 76. Thus, the corresponding virtual address (VA) is found (VA=PA.offset−P+R).

Figure 30:
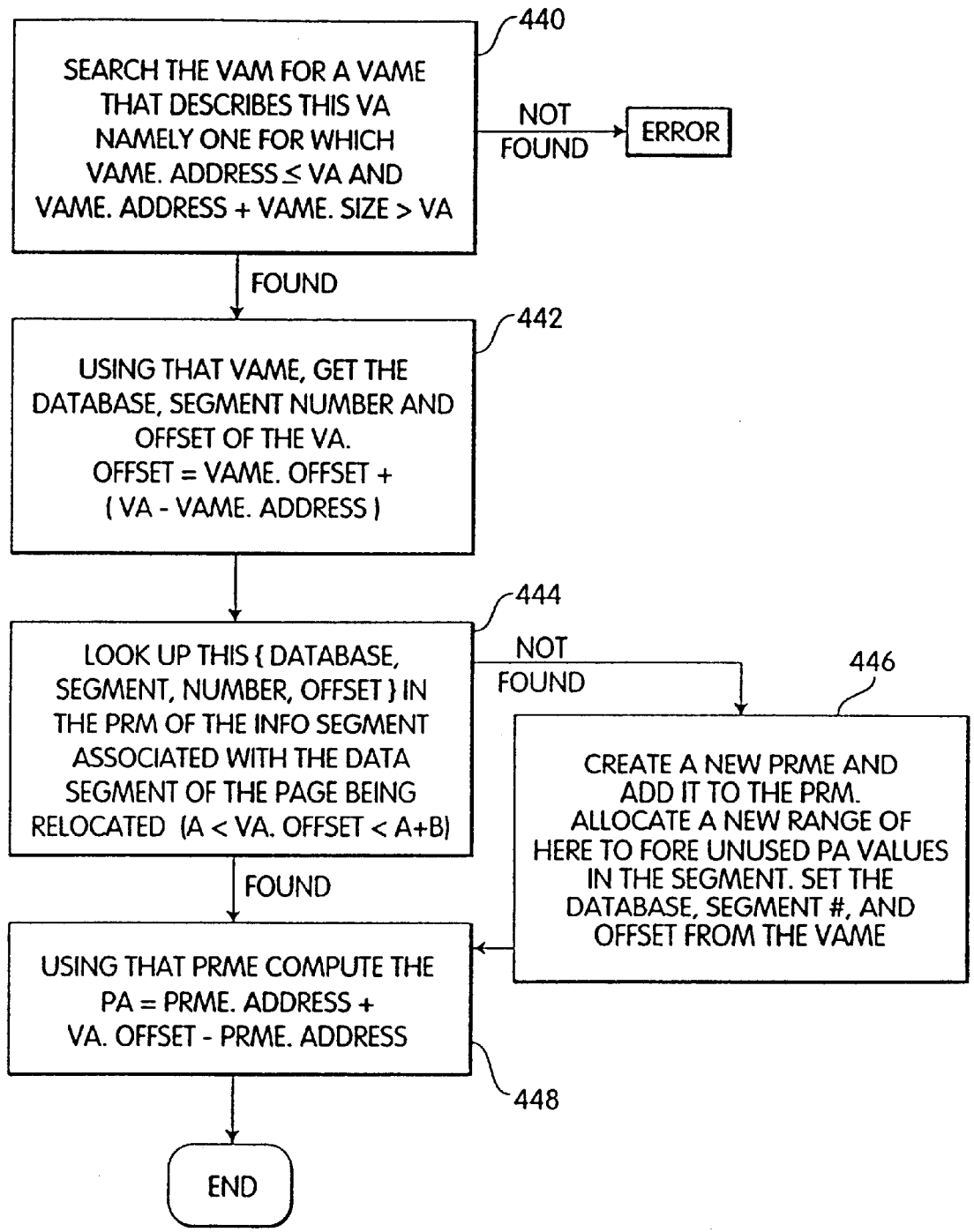
FIG. 30 is a flowchart describing the method of relocating a value outbound.

Relocating a value outbound, that is, converting a virtual address 232 to a persistent address 230 is done in a similar manner. As illustrated in FIG. 30, the virtual address map 210 is searched during step 440 for an entry 212 which describes the virtual address 232 to be relocated. Since such an entry 212 should exist, if it is not found an error message is sent or signaled. The desired entry for a virtual address is one for which the virtual address 232 is greater than or equal to the value R found in the address field 222 of the virtual address map entry 212 and for which the virtual address VA is less than the sum of the address R and the value Q of length field 220 representing the size of the page (R VA≦R+ Q). Once the entry is found, the database 214 and segment number 216 are retrieved. The offset of the virtual address from the beginning of that segment (VA.Offset) is determined (during step 442) by finding the difference between the address R of the VAME 212 and the virtual address VA, then finding the sum of this difference and the value P of offset field 218 of the VAME and 212. (VA.offset=P+VA−R).

Using this database 214, segment number 216 and offset from the beginning of the segment (VA.offset), an entry 152 of the PRM 150 is found, during step 444, in the information segment 78 associated with the data segment 76 of the page being relocated. The step 444 of finding is performed by locating an entry 152 whose database 154 and segment 156 are equal to the desired database 214 and segment 216, and for which the previously calculated offset (VA.offset) is greater than or equal to the value A of the offset field 158 of the PRM entry 152 but less than the sum of the offset A and the value B of the length field 160 (A<VA.offset<A+B).

If such a PRM entry 152 is not found, because of a new or changed object, a new entry is created during step 446 and added to the persistent relocation map PRM 150. A new range of heretofore unused persistent address values for that segment 76 is allocated to this entry. The database 214, segment number 216, and offset 218 from the VAME 212 are used to create the PRM entry 152.

When a PRM entry 152 has been found or created, the persistent address PA 230 for the virtual address 232 being relocated is computed (step 448). This new persistent address 230 is the sum of the value C of the address field 122 of the PRM entry 152 and the difference between the offset of the virtual address (VA.offset) and the value A of the offset field 158 of the PRM entry 152. (PA=C+VA.offset−A).

After relocating each value of each object of a desired page, transactions can proceed on the database after the page is mapped into virtual memory.

For each page mapped into the virtual memory, the operating system 68 of the client computer 40 typically controls two important things about the page: the protection state of the page and the physical addresses mapped into that page. The protection state for a page can be "no access", "read allowed", or "read and write allowed". If an application attempts to read or write on a location in the virtual memory and the protection state of the page is "no access" (because no data has been mapped into the page), or if it attempts to write a location whose protection state is "read allowed," the attempt fails. This occurrence is called a "virtual memory fault".

A virtual memory fault causes the operating system 68 of the client computer 40 to take control of the transaction. The operating system then transfers control to the virtual memory mapping database system 66 (VMMDB) of the present invention. The exact mechanism by which the VMMDB takes control after a fault would depend on the particular operating system 68 being used on the client computer. For a typical operating system, the VMMDB 66, during its initialization, invokes the operating system using a system call to establish a handler subroutine, which tells the operating system 68 that if a virtual memory fault occurs, the subroutine should be invoked. The subroutine is part of the VMMDB 66 and is called the "virtual memory fault handler." The fault handler is described in part by FIG. 31 and illustrates the method for resolving a read fault.

Figure 31:
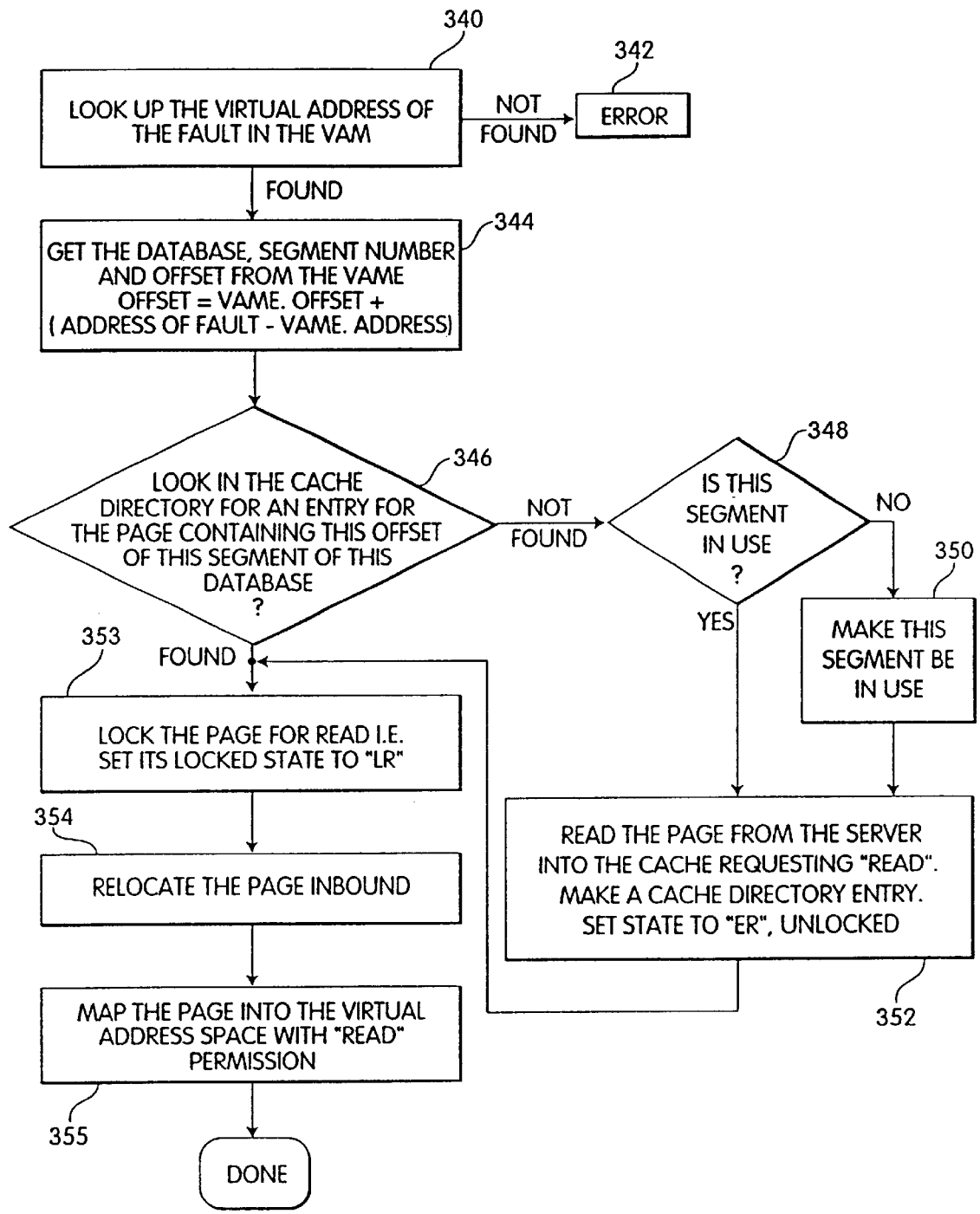
FIG. 31 is a flowchart describing the method of handling a read fault.

Referring now to FIG. 31, the initial step 340 of resolving a read fault, involves finding the entry 212 in the virtual address map 210 (VAM) that corresponds to the virtual address of the fault. The entry is found in a manner similar to that of step 440 of FIG. 30. If this entry 212 is not found, an error message is sent during step 342, because an application can only have access to a true virtual address if that address had been previously assigned to some data segment 76 through assignment steps described above with reference to FIG. 22.

From that entry 212, the database 214, segment member 216, and offset 218 of the fault address are retrieved (step 344). The offset of the address of the fault is equal to the sum of the offset 218 found in the entry 212 of the VAM and the difference between the address of the fault and the address 222 found in that virtual address map entry 212. Thus, the offset of the fault address from the beginning of database segment 76 is found.

The cache directory 180 of the client 40 is then examined (during step 346) to determine if the page of this database segment which contains the fault address offset has been loaded into the cache 56, or whether it needs to be retrieved from the server 44. The page need not be in the cache 56 because assignment of addresses is done on a per-segment basis independent of retrieval of a page. If the page is not found in cache directory 180, it is then determined, through step 348, if the whole segment 74 containing this page has been assigned to virtual address space. Recall that a page may have been assigned to virtual addresses through the assignment of a segment other than the one in which it is located. This step 348 of determining the assignment status of a segment could be completed by retrieving and examining the information segment 78 corresponding to this data segment 76 and verifying that each entry 152 in the persistent relocation map (PRM) 150 has a corresponding virtual relocation address map entry 212. A better way to determine the assignment status of a segment is to provide a per-segment field 185 (FIG. 13) in the cache directory 180 to indicate whether a segment 74 has been assigned virtual addresses. If assignment has not been completed for the data segment of the desired page, it is then performed (step 350), as described above and illustrated in FIG. 22. If necessary, the page can be read from the server 44 into the cache 56 of client 40 during step 352 in the manner described above and illustrated in FIG. 23. After assignment, the encached state of the page is set, the segment marked as "in use," and the looked state "unlocked," in the cache directory. The fields "downgrade when done" 182 and "evict when done" 184 are reset.

If the page is in the cache 56, either as a result of being found during step 346 or as a result of being read from the server during step 352, and assignment for that segment is verified, if necessary, during steps 348 and 350, the page can then be locked for reading (step 353) by setting its locked state to LR. The page can then be relocated in the above-described manner (step 354) and then mapped (step 355) into virtual memory with "read" permission. The step 353 of locking can occur before, between or after the steps 354 and 355 of relocation and mapping. The previously failed instruction that caused the fault can then be re-executed and no fault should occur.

Figure 32:
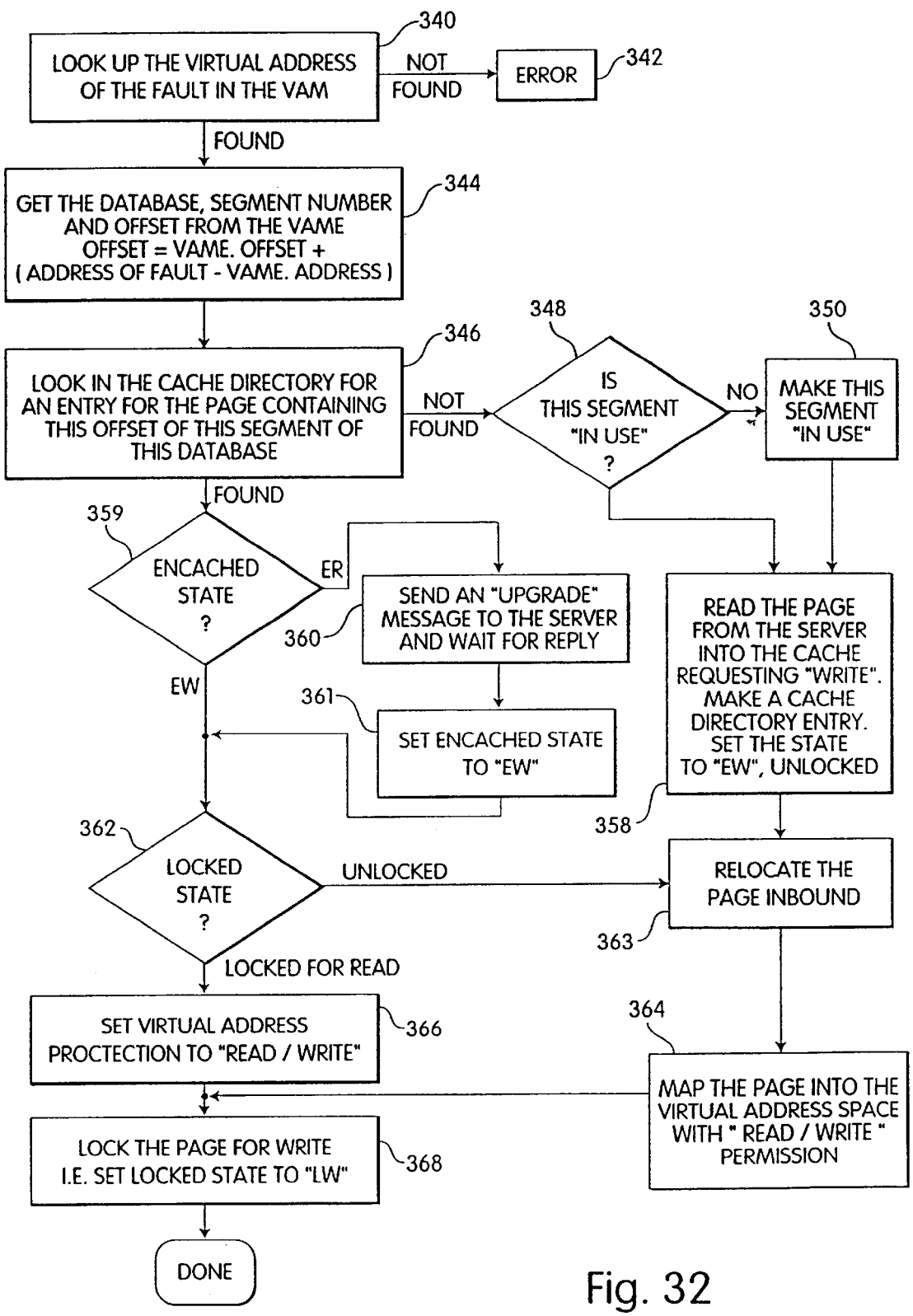
FIG. 32 is a flowchart describing the method of handling a write fault.
Figure 33:
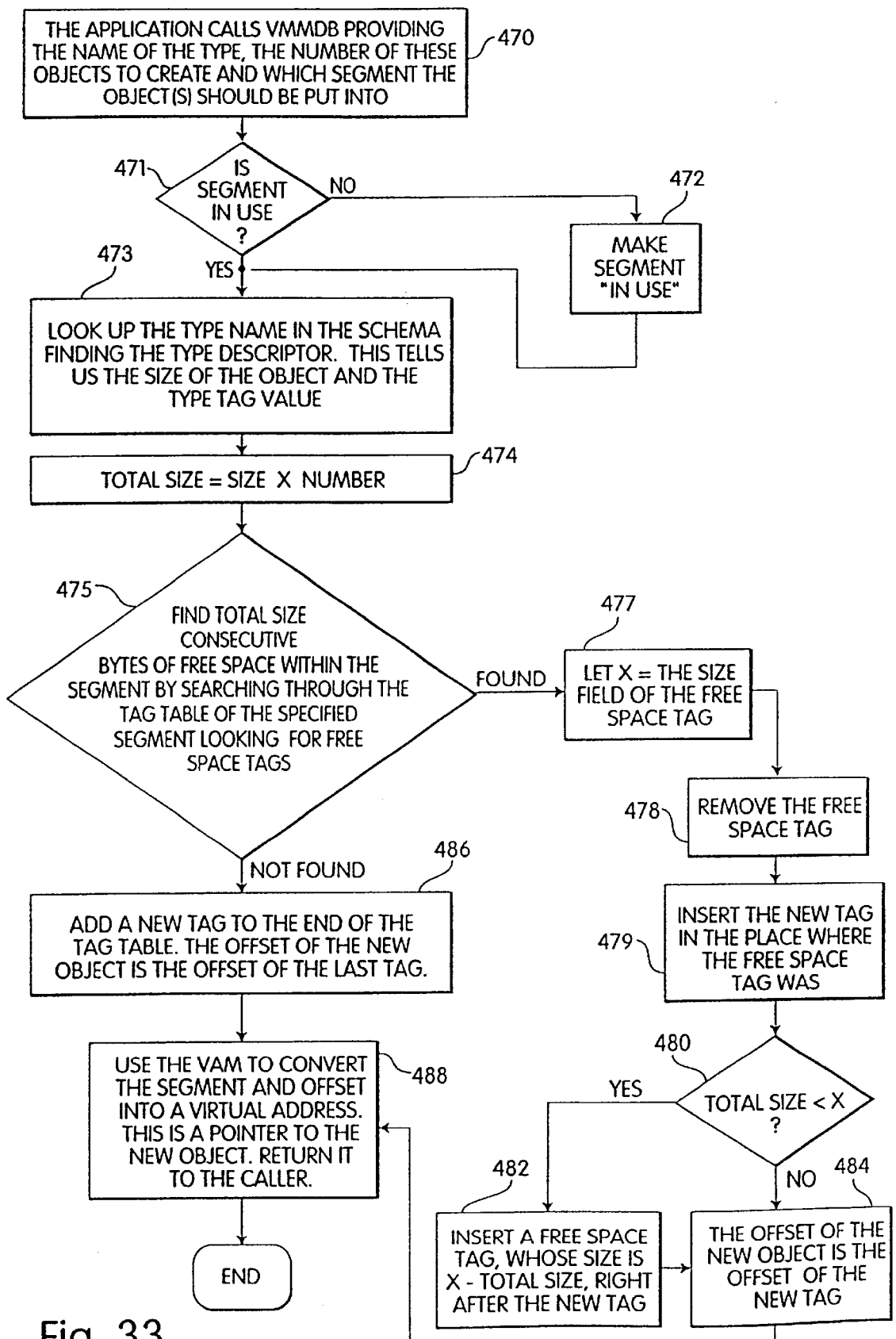
FIG. 33 is a flowchart describing the method for creating an object.

A write fault is handled as described through FIG. 32 in a manner similar to a read fault. Similar reference numerals indicate similar actions or steps and do not necessarily indicate the same body of program code. An entry for the virtual address of the fault is found in the VAM 210 during step 340. If it is not found an error message is issued in step 342, as described above for a read fault. The offset of the virtual address fault from the beginning of the database segment 76 is found (step 344), and the client's cache directory 180 is searched for the cache entry 186 for the page containing this offset of this segment 76 of the database (step 346). If an entry 186 for this page is not found in the cache directory 180 (FIG. 13), the status of assignment of the segment 74 containing this page to the virtual address space 200 is determined during step 348. If assignment has not been completed for this data segment 76, it is then performed (step 350).

If the page is not in the cache, a request is sent by the client 40 to the server 44 for the desired page indicating the need for write access (step 358). This request is handled as described above and illustrated in FIG. 24. When the page is retrieved, a cache directory entry 186 is created and the page state 176, 178 is set to encached for write" and "unlocked". The fields "downgrade when done" 182 and "evicts when done" 184 are also reset.

If an entry 186 for the required page from the database 70 is found in the cache directory 180 during step 346, encached status field 176 of the entry 186 is examined in step 359 to determine the encached state of the page. If the page is already encached for read, the server 44 is sent a message (step 360) indicating that an upgrade to "encached for write" status is requested. The server 44 handles this upgrade request in a manner similar to a request for a page for write as illustrated in FIG. 20 and described above. When the server 44 replies, the cache directory entry 186 has its encached status field 176 set to "encached for write" or "EW" (step 361).

When the encached state is verified to be "encached for write", the lock status field 178 of that cache directory entry 186 is examined in step 362. If the lock status 178 of the cache directory entry 186 is "encached for write" and "unlocked", thus indicating a "no access" fault, (this is also the state of the entry 186 after step 358), the desired page needs to be relocated in step 363. After relocation, the page is mapped (step 364) into virtual memory for "read/write" access. If the page was locked for read, indicating that the page has been relocated and mapped but write permission denied, the virtual memory protection is simply set to "read/write" access in step 366. When a page is relocated and mapped into virtual memory for "read/write" access, the page is locked for write in step 368. At this point, the conditions that caused the virtual memory fault are corrected and the instruction that caused the fault can be re-executed. A fault should no longer occur.

An application program can also create and delete objects. These processes of creating and deleting objects are described in connection with FIGS. 33 and 34 A–B respectively. To create an object, an application program, during step 470, provides the name of the type of the object, the number of the objects to create, and the segment in which the objects should be placed. Next, it is determined in step 471 if assignment has been completed for this segment. This step of determining is completed in a manner similar to step 348 of FIGS. 31 and 32. If an assignment has not been completed for this segment, it is then performed (step 472 ) as described above in connection with FIG. 22.

When it is verified that assignment has been completed for that segment, the type name for the object is found in the schema 120 (FIG. 10). From this entry in the database schema, the size 134 and type tag value 132 can be retrieved. Next, the total size of the object is calculated (step 474). The total size is equal to the product of the desired number of objects to be created and the size 134 of that object.

Given the total size of the object to be created, an area of consecutive free space is found in the segment by the client such that the size of the free space is equal to the total size of that object (step 475). This step 475 of finding free space within the desired segment is completed by searching through the tag table of the information segment and examining free space tags. It is also possible to have an additional data structure which indicates locations of free space within a segment.

If a region with free space is found, the size field 114 of the free space tag 90 (FIG. 9C) is retrieved (step 477). The free space tag is then removed (step 478) and a new tag is inserted (step 479) in the place of the free space tag that was removed (479). The size of the object is then compared to the size of the free space which it replaced (step 480). If the size of the new object is smaller then the free space, a free space tag is inserted in the tag table whose size is the difference of the total size of the created object and the size of the original free space field (step 482). Whether or not a free space tag is inserted, the offset of the new object is set (step 484) to the offset of the new tag.

If an adequate amount of free space was not found (in step 475) a new tag is added to the end of the tag table in step 486. The offset of the new object is then said to be the offset of this last tag. An object is normally not divided when it is placed in the segment.

After steps 486 or 484 of setting the offset of the new object, the virtual address map is used to convert the segment and offset into a virtual address (step 488). This virtual address is assigned to the new object, which is returned to the client.

Figure 34A:
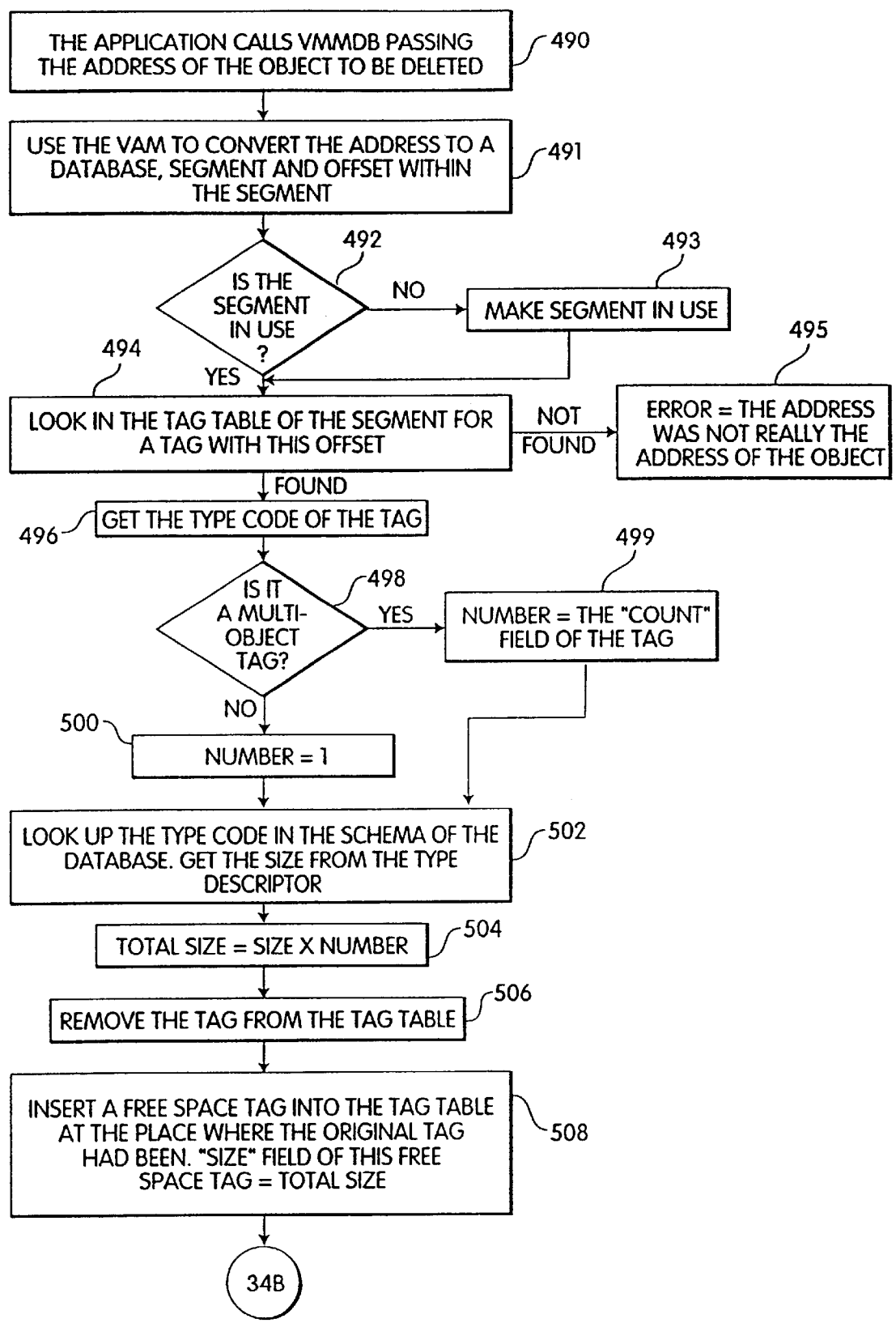
FIGS. 34A–B illustrate a flowchart describing the method for deleting an object.
Figure 34B:
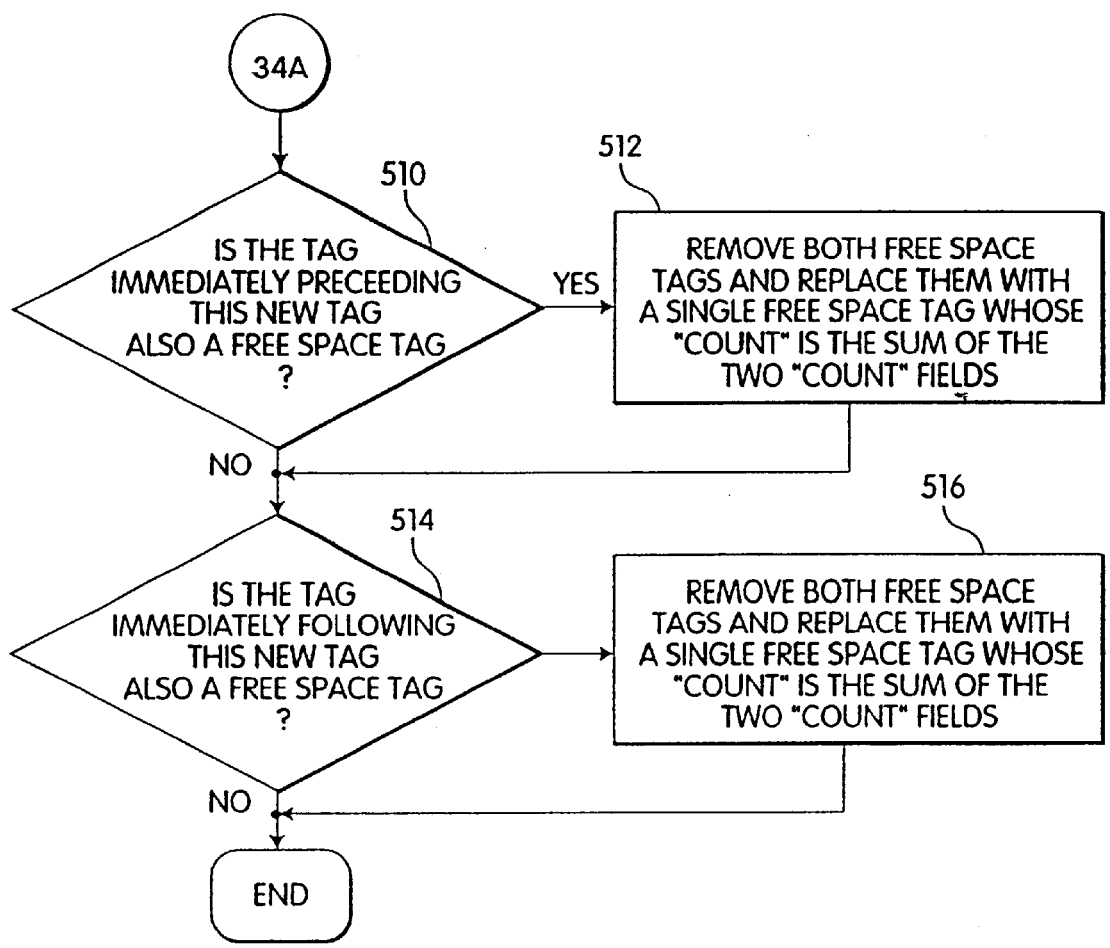

The method of deleting an object will now be described in connection with FIGS. 34A–B. When an application deletes an object, the VMMDB is given the address in step 490. It then uses the address in step 491 to find a corresponding entry in the virtual address map to retrieve a database segment and offset of that address within the segment, in a manner similar to that of step 344 of FIGS. 30 and 31. Given the database segment and offset, it is then determined in step 492 whether the segment has been assigned virtual addresses. This step 492 of determination is performed in a manner similar to step 348 of FIGS. 31 and 32. If the segment has not been assigned virtual addresses, assignment is performed in step 493 in the manner similar to that as described above in connection with FIG. 22.

When assignment for the segment has been verified, the client 40 continues by searching, in step 494, the tag table of the segment for a tag having the determined offset. If the tag is not found, an error message is signaled (step 495). When the tag is found, the type code of the tag is retrieved (step 496). It is then determined if the object is a vector tag (step 498). If it is determined in step 498 that the object tag is for a vector object, a variable "number" is set to the value of the count field 108 of a tag (step 499). Otherwise, the variable "number" is set to 1 (step 500). Also using the type code of the tag, its corresponding type descriptor is found in the schema for the database, and the size of that object is retrieved (step 502).

Given the size and number of the objects in the vector object, the total size is calculated in step 504 by finding the product of the size and number. The tag is removed (step 506) from the tag table, and a free space tag is inserted (step 508) at the place of the original tag. The size field of the free space tag is set to the total size calculated in step 504.

When a free space tag has been inserted, the immediately preceding tag is examined in step 510 to determine if it is also a free space tag. If the preceding tag is a free space tag, both free space tags are removed and replaced with a single free space tag whose count field is the sum of the two count fields of the removed free space tag. (step 512). The immediately following tag is also examined in step 514 to determine if it is also a free space tag. If the following tag is a free space tag, both tags are replaced with a single tag whose count field is the sum of the two count fields of the removed tags (step 516).

When a single free space tag has been inserted to remove the deleted object, the process of deleting the object is complete.

Figure 35:
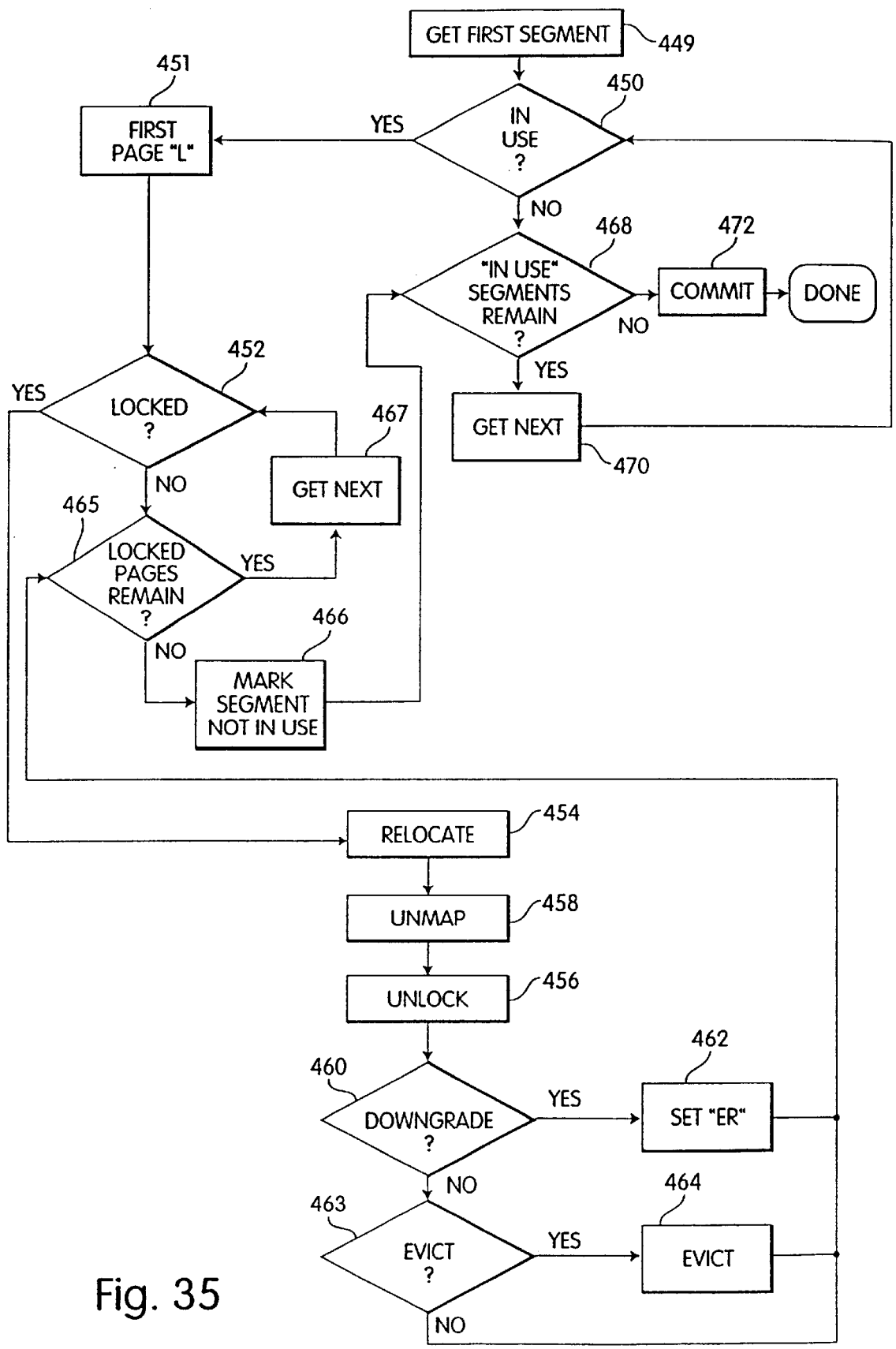
FIG. 35 is a flowchart describing the method of committing a transaction.

When a transaction finally commits, the client 40 releases its locks and removes all assignments and mappings to virtual memory. Data may however remain in the cache. The next transaction starts afresh. The first step in committing a transaction, as illustrated in FIG. 35, is to determine (during 450) which segments are in use, (i.e. which data segments 76 have virtual address relocation map entries 212). As described above in connection with the method of assignment in FIG. 22, a field 185 in the cache directory 180 is most useful for keeping track of whether a segment 76 is "in use" or not. Thus, the determination step 450 could be performed by the client 40 by use of its cache directory 180. For any "in use" segment, the entry 186 in the cache directory 180 for the first page is retrieved (step 451) to examine its lock status field 178 (step 452). Each locked page is relocated outbound, during step 454, in the manner described above in connection with FIGS. 27, 28 and 30. The lock status 178 for each page is set to "unlocked" (step 456), and during the step 458, the page is unmapped from virtual memory 200. Unlocking or setting the lock status field 178 to "unlocked", (step 456) can be performed before, after or between the steps of relocating and unmapping. If the entry 186 for the page in the cache directory 180 indicates (from step 460) the page is to be "downgraded when done" (field 182), the encached state 176 for the page is set to "encached for read". If the page is not marked "downgrade when done", it is determined whether the page is marked "evict when done" by examining (step 463) field 184 of its entry 186 in the cache directory 180. If the page is marked "evict when done", the page is removed (evicted) (step 464) from the cache 56. If the page has been modified, its new contents are written to the database on the server 44.

If a page is determined to be unlocked during step 452 or after the page is downgraded or evicted, if necessary, it is determined through step 465 if locked pages remain in the segment 76 to be relocated, unmapped and unlocked. If pages remain, the next entry in the cache directory is retrieved (step 467) and is determined through step 452, if this page is locked, as described above. Processing continues as described above until all pages in a segment have been relocated, unmapped and unlocked.

Once every locked page in a segment 76 has been relocated, unmapped, unlocked and downgraded or evicted if necessary, the segment 76 is marked as "not in use" in field 185 of the entry 186 in the cache directory 180 (step 466). The cache directory is then examined to determine if any segments remain to be relocated, unmapped, unlocked and downgraded or evicted, (step 468). If segments remain, the next entry in the cache directory is retrieved (step 470) and it is determined, through step 450, if this segment is "in use" as described above.

When iteration through all "in use" segments is completed, a commit message is sent (step 472) by the client 40 to the server 44 and the transaction is completed.

Unmapping of data segments 76, including removal of all assignments, is performed after each transaction in order to free virtual memory space 200 for future transactions. Removal of assignments is necessary since a lock cannot be undone during a transaction (due to strict two-phase locking) and it is possible to run out of virtual memory during a transaction if data segments are not unmapped at the end of other transactions.

Having now described a preferred embodiment of the present invention, it should be apparent to one skilled in the art that numerous other embodiments and modifications thereof are contemplated as falling within the scope of the present invention as defined by the appended claims.

What is claimed is:

1. An apparatus for virtual memory mapping and transaction management for a database system, comprising:

at least one permanent storage device for storing data in at least one database, a plurality of client computers each having a cache memory for storing data and a processing unit, the processing unit including means for requesting data from said at least one database and means for transferring data between the at least one permanent storage device and the cache memory, means, responsive to a request for data from a database from the means for requesting of a first client computer, for detecting if requested data is in the cache memory of a second client computer and has a cached state such that access to the data by the first client computer is not permitted, means, responsive to a detection by said means for detecting that access to the data by the first client computer is not permitted, for instructing said second client computer to change the cached state of the data, and means for transferring said requested data to the first client computer after the second client computer characterizes the cached state of the data, wherein a request for data is one of a read request and a write request, wherein said at least one database is divided into segments, each containing one or more pages and wherein said means for transferring said requested data transfers a page containing the requested data, wherein the apparatus further comprises:

means, responsive to a transfer of a page in response to a read request for the page, for encaching the page for read and for locking the page for read at the first client computer, and means, responsive to a transfer of a page in response to a write request for the page for encaching the page for write and for locking the page for write at the first client computer.

2. An apparatus as set forth in claim 1 wherein the computer system has a server computer for each permanent storage device, wherein the apparatus further comprises:

means, responsive to a request for data from a database for read access from the means for requesting of the first client computer, for detecting if the requested data is in the cache memory of the second client computer for write access, means, responsive to a detection by the means for detecting that the requested data is in the cache memory of the second client computer for write access, for instructing the second client computer to downgrade the encached state of the data to read access, and means for transferring the requested data to the first client computer.

3. An apparatus as set forth in claim 2 wherein each server computer has an ownership table having an entry for each page of the permanent storage device of the server computer which is encached at one of the plurality of client computers, each entry for a page indicating which client computers have the page encached and whether the page is encached for one of read and write access, and wherein the means for detecting utilizes the ownership table to determine if the page is encached for write.

4. An apparatus as set forth in claim 3 further comprising:
means for querying one of the plurality of client computers having the page encached for write to determine if the page is locked for write, and
means, responsive to a response from a queried computer that the page is not locked for write, for downgrading the entry for the page in the ownership table from indicating encached for write to indicating encached for read, and for permitting the means for transferring said requested data to transfer the page to the cache memory of the requesting client computer.

5. An apparatus as set forth in claim 4, wherein the computer system has an application program involving at least one transaction, wherein the apparatus further comprises:
means, responsive to a response from the queried client computer that the page is locked for write, for deferring further action until the transaction being run at the queried client computer commits, and wherein said means for downgrading and for permitting being operative when the queried client computer transaction commits.

6. An apparatus as set forth in claim 5 wherein each client computer has a cache directory having an entry for each page in the corresponding cache memory, which entry indicates a cached state and a locked state of the page, wherein the apparatus further comprises means, responsive to a query as to whether the page is locked for write, for looking up the page in the cache directory of the queried client computer to determine if the page is locked for write.

7. An apparatus as set forth in claim 6 wherein the queried client computer includes means, responsive to a determination that the page is not locked for write, for downgrading the cached state of the entry for the page in the cache directory from indicating encached for write to indicating encached for read, and for replying to a querying server computer that the page is not locked for write.

8. An apparatus as set forth in claim 7, wherein the queried client computer includes means, responsive to a determination that the page is locked for write, for marking the entry for the page in the cache directory to be downgraded when the transaction commits, and wherein said means for downgrading and for replying being operative when the transaction being run on the queried client computer commits.

9. An apparatus as set forth in claim 1 wherein the computer system has a server computer for each of the at least one permanent storage device, wherein the apparatus further comprises:
means, responsive to a request for data from a database for write access from the means for requesting of the first client computer, for detecting if the requested data is in the cache memory of the second client computer,
means, responsive to a detection by the means for detecting that the requested data is in the cache memory of the second client computer, for instructing the second client computer to remove the data from its cache memory, and
means for transferring the requested data to the first client computer.

10. An apparatus as set forth in claim 9, wherein each server computer has an ownership table having an entry for each page of the permanent storage device of the server computer which is encached at any client computer, each entry for a page indicating which client computers have the page encached and whether the page is encached for one of read and write, and wherein the means for detecting utilizes the ownership table to determine if the page is encached.

11. An apparatus as set forth in claim 10 further comprising:
means for querying each client computer having the page encached to determine if the page is also locked, and
means, responsive to a reply from all queried client computers that the page is not locked, for removing all entries for the page from the ownership table, and for making an entry for the requesting client computer in the ownership table, and for permitting the means for transferring said requested data to transfer the page to the cache memory of the requesting client computer.

12. An apparatus as set forth in claim 11 wherein the computer system has an application program involving at least one transaction, and, wherein the apparatus further comprises:
means, responsive to a response from at least one queried client computer that the page is locked, for deferring further action until the transactions being run on all said at least one queried client computers commit,
and wherein said means for removing all entries, and for making an entry and for permitting being operative when the transactions being run on all queried client computers commit.

13. An apparatus as set forth in claim 12 wherein each client computer has a cache directory having an entry for each page in the corresponding cache memory, which entry indicates a cached state and a locked state of the page wherein the apparatus further comprises:
means, responsive to a locked query, for looking up the page in a cache directory of the queried client computer to determine if the page is locked.

14. An apparatus as set forth in claim 13 wherein the queried client computer includes means, responsive to a determination that the page is unlocked, for removing the page from the cache memory of the queried client computer, and for removing the entry for the page from the cache directory, and for replying to a querying server computer that the page is unlocked.

15. An apparatus as claimed in claim 14 wherein the queried client computer includes means, responsive to a determination that the page is locked, for marking the entry for the page in the cache directory to be evicted when the transaction commits, and for replying to the querying server computer that the page is locked, and wherein said means for removing the page, removing the entry, and for replying being operative when the transaction being run on the queried client computer commits.

16. A method for virtual memory mapping and transaction management for a computer system, the computer system having at least one permanent storage device for storing data in at least one database, a plurality of client computers each having a cache memory for storing data and a processing unit, the processing unit including means for requesting data from said at least one database and means for transferring data between the at least one permanent storage device and the cache memory of a client computer, said method comprising the steps of:
detecting, in response to a request for data from a database from the means for requesting of a first client computer, if the requested data is in the cache memory of a second client computer and has a cached state such that access to the data by the first client computer is not permitted, instructing said second client computer to change the cached state of the data in response to a detection that access to the data by the first client computer is not permitted, and transferring said requested data to the first client computer after the second client computer changes the cached state of the data, wherein a request for data is one of a read request and a write request, wherein a database is divided into segments, each containing at least one page and wherein the step of transferring includes transferring the page containing requested data, said method further comprising the steps of:

encaching the page for read, in response to a transfer of the page in response to a read request for the page, and locking the page for read at the first client computer and, encaching the page for write, in response to a transfer of the page in response to a write request for the page, and locking the page for write at the first client computer.

17. A method as set forth in claim 16 wherein the computer system includes a server computer for each permanent storage device, said method further comprising the steps of:

detecting, in response to a request for data from a database for read access from the means for requesting of the first client computer, if the requested data is in the cache memory of the second client computer for write access, and instructing the second client computer in response to a detection that the requested data is in the cache memory of the second client computer to downgrade the cached state of the data to read access.

18. A method as set forth in claim 17 wherein each server computer has an ownership table having an entry for each page of the permanent storage device of the server computer which is encached at any client computer, each entry for a page indicating which client computers have the page encached and whether the page is encached for one of read and write access, and wherein the step of detecting includes the step of determining if the page is encached for write utilizing the ownership table.

19. A method as set forth in claim 18 including the steps of:

querying the client computer having the page encached for write to determine if the page is locked for write, and downgrading the entry for the page in the ownership table, in response to a response from the queried computer that the page is not locked for write, from indicating encached for write to indicating encached for read.

20. A method as set forth in claim 19, wherein the computer system includes an application program involving at least one transaction, said method further comprising the step of:

deferring further action, in response to a response from the queried client computer that the page is locked for write, until the transaction being run at the queried client computer commits, and wherein the steps of downgrading and transferring being performed when the transaction performed by the queried client computer commits.

21. A method as set forth in claim 20 wherein each client computer has a cache directory having an entry for each page in the corresponding cache memory, which entry indicates a cached state and a locked state of the page, said method further comprising a step of looking up the page in the cache directory of the queried client computer, in response to a query whether the page is locked for write, to determine if the page is locked for write.

22. A method as set forth in claim 21 further comprising the steps of:

downgrading the cached state of the entry for the page in the cache directory of the queried client computer from indicating encached for write to indicating encached for read, and replying to the querying server computer in response to a determination that the page is not locked for write.

23. A method as set forth in claim 22, further comprising the step of:

marking the entry for the page in the cache directory to be downgraded when the transaction commits in response to a determination that the page is locked for write, and wherein the steps of downgrading and replying being performed when the transaction being run on the queried computer commits.

24. A method as set forth in claim 16 wherein the computer system includes a server computer for each of the at least one permanent storage means, said method including the steps of:

detecting, in response to a request for data from a database for write access from the means for requesting of the first client computer, if the requested data is in the cache memory of the second client computer, and instructing the second client computer, in response to a detection that the requested data is in the cache memory of the second client computer, to remove the data from the cache memory of the second client computer.

25. A method as set forth in claim 24, wherein each server computer has an ownership table having an entry for each page of the permanent storage device of the server computer which is encached at any client computer, each entry for a page indicating which client computer has the page encached and whether the page is encached for one of read and write access, and wherein the step of detecting includes determining if the page is encached utilizing the ownership table.

26. A method as set forth in claim 25 further comprising the steps of:

querying each client computer having a page encached to determine if the page is also locked, removing all entries for the page from the ownership table in response to a reply from all queried client computers that the page is not locked, and making an entry for the client computer, which is requesting data, in the ownership table.

27. A method as set forth in claim 26 wherein the database system includes an application program involving at least one transaction, the method further comprising a step of:

deferring further action, in response to a response from at least one queried client computer that the page is locked, until the transactions being run on all said at least one queried client computers commit, and wherein the steps of removing all entries, making an entry and transferring being performed when all transactions performed by the queried client computer commit.

28. A method as set forth in claim 27 wherein each client computer has a cache directory having an entry for each page in the corresponding cache memory, which entry indicates a cached state and a locked state of the page, said method comprising the step of looking up a page in the cache directory of the queried client computer in response to a locked query to determine if the page is locked.

29. A method as set forth in claim 28, further comprising the steps of:
removing the entry for a page from the cache memory in response to a determination that the page is not locked at the queried client computer, and
replying to the querying server computer that the page is not locked.

30. A method as set forth in claim 29 further comprising the steps of:
marking the entry for the page in the cache directory of the queried client computer to be evicted when the transaction commits in response to a determination that the page is locked, and
replying to the querying server computer that the page is locked,
and wherein the steps of removing the page, removing the entry, and for replying being performed when the transaction being run on the queried client computer commits.

31. An apparatus for virtual memory mapping and transaction management for a computer system, comprising:
a permanent storage device for storing data,
a plurality of client computers each having a cache memory for storing data and a processing unit, the processing unit including a data requesting device coupled to the permanent storage device, that requests data, and a data transferring device interconnected between the permanent storage device and the cache memory, that transfers data between the storage device and the cache memory,
a detection device having an input for receiving a request for data from a database from the data requesting device of a first client computer, and an output for indicating whether the requested data is in the cache memory of a second client computer and has a cached state such that access to the data by the first client computer is not permitted,
an instruction device having an input coupled to the output of the detection device for receiving a detection by said detection device that access to the data by the first client computer is not permitted, and an output for instructing said second client computer to change the cached state of the data, and
a data transfer mechanism that transfers said requested data to the first client computer after the second client computer changes the cached state of the data,
wherein a request for data may be one of a read request and a write request, wherein said data is organized in a database divided into segments, wherein each segment contains one or more pages and wherein said data transfer mechanism transfers a page containing the requested data, wherein the apparatus further comprises:
a read device having an input for receiving a transfer of a page in response to a read request for the page, that encaches the page for read and that locks the page for read at the first client computer, and
a write device having an input for receiving a transfer of a page in response to a write request for the page, that encaches the page for write and that locks the page for write at the client first computer.

32. An apparatus as set forth in claim 31 wherein the computer system has a server computer for the permanent storage device, wherein the apparatus further comprises:
the detection device having an input for receiving a request for data from a database for read access from the requesting device of a first client computer, and an output for indicating whether the requested data is in the cache memory of the second client computer for write access,
the instruction device having an input for receiving a detection by the detection device that the requested data is in the cache memory of the second client computer for write access, and an output for instructing the second client computer to downgrade the encached state of the data to read access, and
the data transfer mechanism that transfers the requested data to the first client computer.

33. An apparatus as set forth in claim 31 wherein each server computer has an ownership table having an entry for each page of the permanent storage device of the server computer which is encached at one of the plurality of client computers, each entry for a page indicating which client computers have the page encached and whether the page is encached for one of read and write access, and wherein the detection device utilizes the ownership table to determine if the page is encached for write.

34. An apparatus as set forth in claim 32 further comprising:
a querying device having an output for querying one of the plurality of client computers having the page encached for write to determine if the page is locked for write, and
a downgrading and unlocking device having an input for receiving a response from a queried computer that the page is not locked for write, and a first output that downgrades the entry for the page in the ownership table from indicating encached for write to indicate encached for read, and a second output coupled to the data transferring device that permits the data transfer mechanism to transfer the page to the cache memory of the requesting client computer.

35. An apparatus as set forth in claim 33, wherein the computer system has an application program involving at least one transaction, wherein the apparatus further comprises:
a deferral device having an input for receiving a response from the queried client computer that the page is locked for write, and an output for indicating that further action is deferred until the transaction being run at the queried client computer commits, said downgrading and unlocking device being operative when the queried client computer transaction commits.

36. An apparatus as set forth in claim 34 wherein each client computer has a cache directory having an entry for each page in the corresponding cache memory, which entry indicates a cached state and a locked state of the page, wherein the apparatus further comprises:
a lookup table mechanism having an input for receiving a query as to whether the page is locked for write, that looks up the page in the cache directory of the queried client computer to determine if the page is locked for write.

37. An apparatus as set forth in claim 35 wherein the queried client computer includes a downgrading and replying device having an input for receiving a determination that the page is not locked for write, a first output for downgrading the cached state of the entry for the page in the cache directory from indicating encached for write to indicate encached for read, and a second output for replying to a querying server computer that the page is not locked for write.

38. An apparatus as set forth in claim 36, wherein the queried client computer includes a marking device having an input for receiving a determination that the page is locked for write, an output for marking the entry for the page in the cache directory to be downgraded when the transaction commits, said downgrading and replying device being operative when the transaction being run on the queried client computer commits.

39. An apparatus as set forth in claim 31 wherein the database system has a plurality of client computers and a server computer for each of the at least one permanent storage device, wherein the apparatus further comprises:
  the detection device having an input for receiving a request for data from a database for write access from the requesting device of a first client computer, and an output for indicating whether the requested data is in the cache memory of a second client computer,
  the instruction device having an input coupled to the output of the detection device for receiving a detection by the detecting device that the requested data is in the cache memory of the second client computer, and an output for instructing the second client computer to remove the data from its cache memory, and
  the data transfer mechanism that transfers the requested data to the first client computer.

40. An apparatus as set forth in claim 39, wherein each server computer has an ownership table having an entry for each page of the permanent storage device of the server computer which is encached at any client computer, each entry for a page indicating which client computers have the page encached and whether the page is encached for one of read and write, and wherein the detection device utilizes the ownership table to determine if the page is encached.

41. An apparatus as set forth in claim 40 further comprising:
  a querying device having an output for querying each client computer having the page encached to determine if the page is also locked, and
  a mechanism having an input for receiving a reply from all queried client computers that the page is not locked, a first output for removing all entries for the page from the ownership table, and a second output for making an entry for the requesting client computer in the ownership table, and a third output coupled to the data transferring device for permitting the data transferring device to transfer the page to the cache memory of the requesting client computer.

42. An apparatus as set forth in claim 41 wherein the database system has an application program involving at least one transaction, and, wherein the apparatus further comprises:
  a deferral device having an input that receives a response from at least one queried client computer that the page is locked, that defers further action until the transactions being run on all said at least one queried client computers commit, said mechanism being operative when the transactions being run on all queried client computers commit.

43. An apparatus as set forth in claim 42 wherein each client computer has a cache directory having an entry for each page in the corresponding cache memory, which entry indicates a cached state and a locked state of the page wherein the apparatus further a lookup table device having an input for receiving a locked query, and an output for looking up the page in the cache directory of a queried client computer to determine if the page is locked.

44. An apparatus as set forth in claim 43 wherein the queried client computer includes a removing and replying device for receiving a determination that the page is unlocked, having a first output for removing the page from the cache memory of the queried client computer, and a second output for removing the entry for the page from the cache directory, and third output for replying to a querying server computer that the page is unlocked.

45. An apparatus as claimed in claim 44 wherein the queried client computer includes a marking and replying device having an input for receiving a determination that the page is locked, a first output for marking the entry for the page in the cache directory to be evicted when the transaction commits, and a third output for replying to the querying server computer that the page is locked, said removing and replying device being operative when the transaction being run on the queried client computer commits.

46. A method for virtual memory mapping and transaction management for a computer system, the computer system having at least one permanent storage device for storing data in at least one database, a plurality of client computers each having a cache memory for storing data and a processing unit, the processing unit including means for requesting data from said at least one database and means for transferring data between the at least one permanent storage device and the cache, memory of the client computer, wherein the at least one database is divided into segments containing at least one page, said method comprising:
  detecting, in response to a request for data from the database from the means for requesting of a first client computer, if the requested data is in the cache memory of a second client computer and has a cached state such that access to the data by the first client computer is not permitted, wherein detecting includes detecting if the requested data is in the cache memory of the second client computer in response to a request for at least one of a read access and a write access,
  instructing said second client computer to change the cached state of the data in response to a detection that access to the data by the first client computer is not permitted, wherein instructing includes instructing the second client computer to remove the requested data from the cache of the second client computer,
  transferring said requested data to the first client computer after the second client computer changes the cached state of the data wherein transferring includes transferring the page of the database segment containing the requested data, and
  encaching the transferred page for read, in response to a transfer of the page in response to a read request for the page, and locking the page for read at the first client computer.

47. A method as set forth in claim 46, further comprising:
  encaching the transferred page for write, in response to a transfer of the page in response to a write request for the page, and locking the page for write at the first client computer.

* * * * *